US009094604B2

(12) United States Patent
Shaw

(10) Patent No.: US 9,094,604 B2
(45) Date of Patent: Jul. 28, 2015

(54) METHOD AND APPARATUS FOR PIXEL DATA EXTREMA DETECTION AND HISTOGRAM GENERATION

(71) Applicant: Semiconductor Components Industries, LLC, Phoenix, AZ (US)

(72) Inventor: Steven Shaw, Ascot (GB)

(73) Assignee: Semiconductor Components Industries, LLC, Phoenix, AZ (US)

( * ) Notice: Subject to any disclaimer, the term of this patent is extended or adjusted under 35 U.S.C. 154(b) by 127 days.

(21) Appl. No.: 13/905,930

(22) Filed: May 30, 2013

(65) Prior Publication Data

US 2013/0329076 A1       Dec. 12, 2013

Related U.S. Application Data

(60) Provisional application No. 61/656,495, filed on Jun. 6, 2012.

(51) Int. Cl.
*H04N 5/232*       (2006.01)
*H04N 5/235*       (2006.01)

(52) U.S. Cl.
CPC ......... *H04N 5/23229* (2013.01); *H04N 5/2351* (2013.01)

(58) Field of Classification Search
CPC ...... G09G 2360/16; G06T 5/40; G06T 7/403; G06K 9/38; G06K 9/4642; G06K 9/4647; G06K 2017/0077; H04N 1/4074; H04N 5/2351; G06F 15/70
USPC ................ 348/51, 207.99, 222.1, 421.1, 672; 382/168–172; 358/522; 702/180; 326/39; 365/230.1; 345/89; 718/100; 708/207; 327/58, 62; 324/103 P, 103 R
See application file for complete search history.

(56) References Cited

U.S. PATENT DOCUMENTS

| 5,398,123 A | 3/1995 | Katsuma |
| 6,081,617 A | 6/2000 | Bangham et al. |

(Continued)

FOREIGN PATENT DOCUMENTS

| JP | 63098078 A | * 4/1988 | ............ G06F 15/70 |
| WO | 2000064141 | 10/2000 | |

OTHER PUBLICATIONS

Nvidia, "Histogram calculation in CUDA," Nov. 2007.*

(Continued)

*Primary Examiner* — Dennis Hogue
(74) *Attorney, Agent, or Firm* — Treyz Law Group; Michael H. Lyons

(57) ABSTRACT

Imaging devices may include an array of image pixels arranged in rows and columns coupled to processing circuitry. The processing circuitry may include histogram generation circuitry and extremum pixel value identification circuitry. The histogram generation circuitry may include sub-histogram generation circuitry that generates pixel value sub-histograms each of which includes pixel values generated by pixels from respective subsets of the rows in the array. Histogram accumulation circuitry may combine the sub-histograms to generate an accumulated histogram. The extremum identification circuitry may process a set of pixel value patches. The identification circuitry may include a first stage of comparator circuitry for identifying an extremum value of each column in the set of patches, a second stage of comparator circuitry for identifying an extremum value of each patch in the set, and a third stage of comparator circuitry for identifying an extremum of the set of pixel value patches.

15 Claims, 14 Drawing Sheets

(56) References Cited

U.S. PATENT DOCUMENTS

| | | | |
|---|---|---|---|
| 8,229,219 B1* | 7/2012 | Ioffe | 382/168 |
| 8,331,668 B2 | 12/2012 | Kuwahara | |
| 2002/0145581 A1* | 10/2002 | Kudo et al. | 345/89 |
| 2008/0158430 A1* | 7/2008 | Hu | 348/672 |
| 2009/0128187 A1* | 5/2009 | Barford | 326/39 |
| 2011/0050861 A1* | 3/2011 | Sakamoto et al. | 348/51 |
| 2011/0222767 A1* | 9/2011 | Mitsunaga | 382/169 |
| 2012/0183224 A1 | 7/2012 | Kirsch | |

OTHER PUBLICATIONS

Jivet et al., "Image Contrast Enhancement using Morphological Decomposition by Reconstruction," WSEAS Transactions on Circuits and Systems, Issue 8, vol. 7, Aug. 2008.*

* cited by examiner

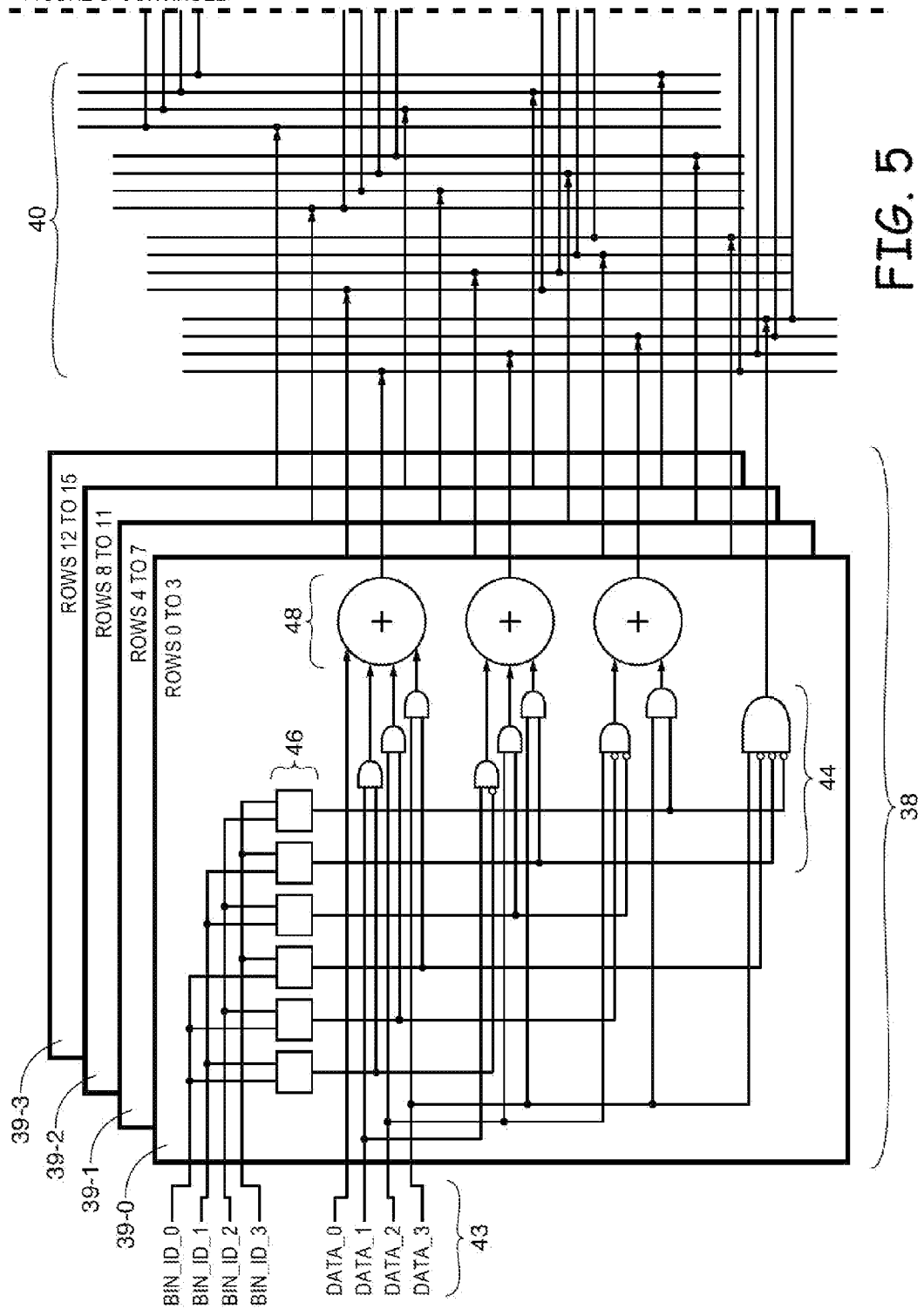

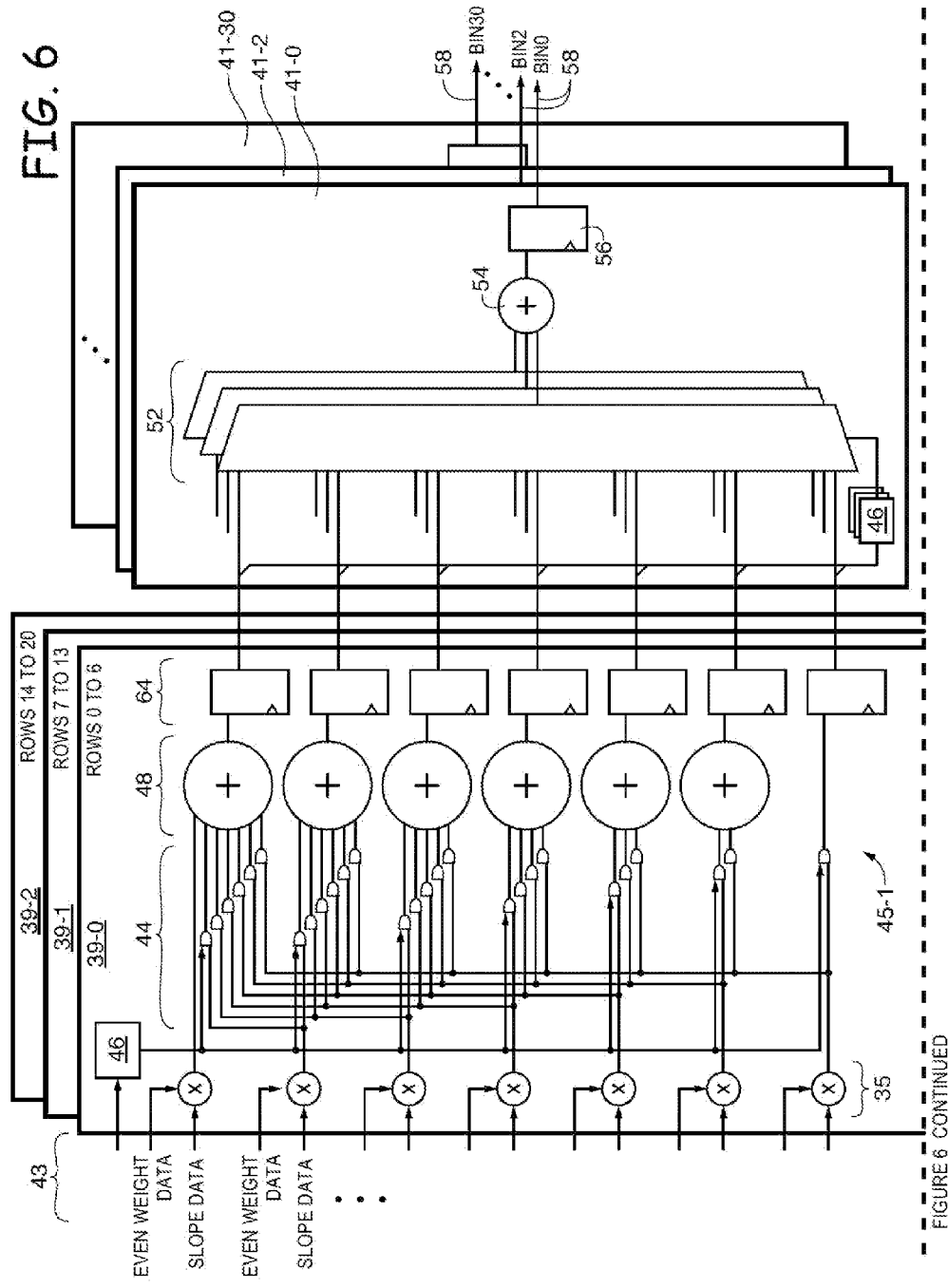

METHOD AND APPARATUS FOR PIXEL DATA EXTREMA DETECTION AND HISTOGRAM GENERATION

This application claims the benefit of provisional patent application No. 61/656,495 filed Jun. 6, 2012, which is hereby incorporated by reference herein in its entirety.

BACKGROUND

This relates generally to imaging devices, and more particularly, to imaging systems with pixel data processing circuitry.

Imaging systems are commonly used in electronic devices such as cellular telephones, cameras, and computers to capture images. Imaging systems include an image sensor and processing circuitry that receives pixel data from the image sensor. It is often useful to determine an extremum pixel value from a set of pixel data and to bin pixel data into a histogram of pixel values.

However, it can be challenging to provide circuitry for determining an extremum pixel value and for generating a histogram of pixel values, because such circuitry typically requires an excessive number of logic circuits, which can lead to undesirably large image sensor chip sizes and can limit the performance of the imaging system.

It may therefore be desirable to be able to provide improved imaging systems with enhanced pixel data processing efficiency.

DETAILED DESCRIPTION

Digital camera modules are widely used in imaging systems such as digital cameras, computers, cellular telephones, or other electronic devices. These imaging systems may include image sensors that gather incoming light to capture an image. The image sensors may include arrays of image sensor pixels. The pixels in an image sensor may include photosensitive elements such as photodiodes that convert the incoming light into digital pixel data. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
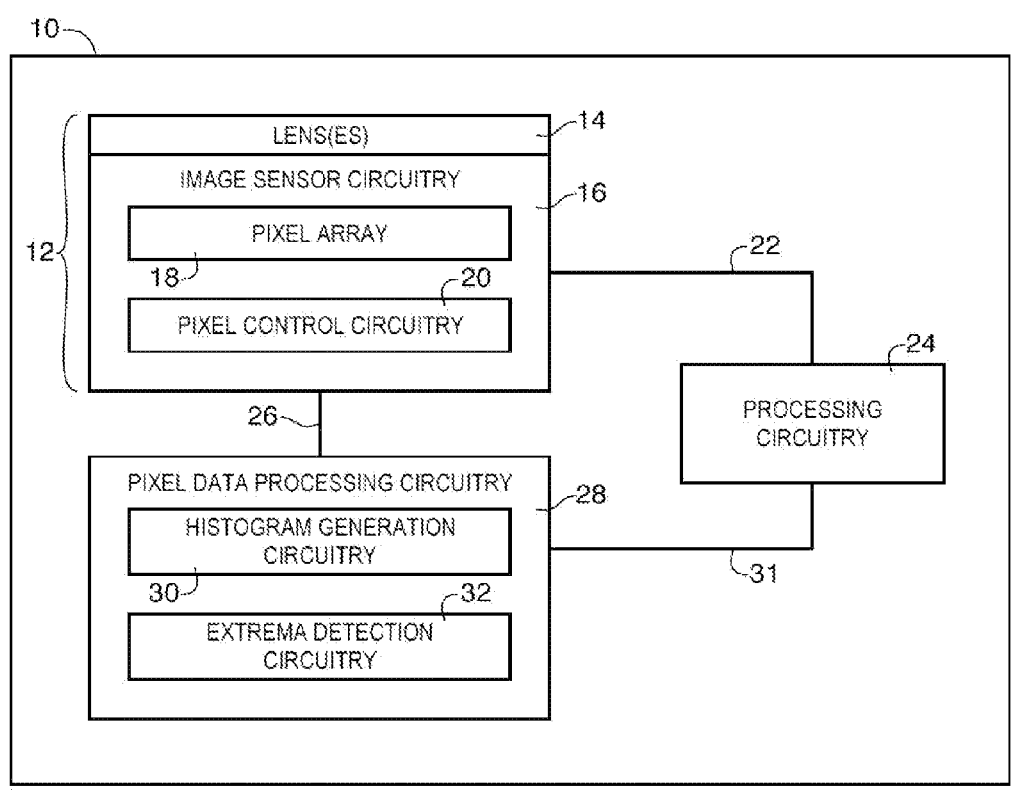
FIG. 1 is a diagram of an illustrative imaging system that contains an image sensor, pixel data histogram generation circuitry, and pixel data extrema detection circuitry in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into electric charges and eventually into digital image data. Camera module 12 may include one or more lenses 14 and one or more corresponding image sensors 16. Image sensor 16 may include arrays of image sensor pixels arranged in a number of rows and columns such as a pixel array 18. Image pixels in pixel array 18 may be controlled using pixel control circuitry 20. During image capture operations, light from a scene may be focused onto pixel array 18 by lens 14. Image sensor 16 may include any number of pixel arrays 18 (e.g., one pixel array, two pixel arrays, ten pixel arrays, etc.).

Image sensor pixels in pixel array 18 may generate pixel data (e.g., a respective pixel value generated by each image sensor pixel) in response to receiving light from a scene. For example, image sensor pixels in array 18 may include photosensitive elements such as photodiodes that convert incoming light into electric charge. Pixel control circuitry 20 may convert the electric charge into digital pixel data. Image sensor 16 may receive control signals from processing circuitry 24 over line 22. If desired, imager sensor 16 may supply pixel data to processing circuitry 24 over line 22. Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16).

Image sensor 16 may pass pixel data to pixel data processing circuitry 28. Pixel data processing circuitry 28 may include one or more integrated circuits (e.g., image processing circuits, microprocessors, storage devices such as random-access memory and non-volatile memory, etc.) and may be implemented using components that are separate from camera module 12 and/or that form part of camera module 12 and components that are separate from processing circuitry 24 and/or that form a part of processing circuitry 24 (e.g., pixel data processing circuitry 28 may be formed on a shared integrated circuit with portions of image sensor 16, on a shared integrated circuit with processing circuitry 24, or on one or more separate integrated circuits).

Pixel data processing circuitry may include histogram generation circuitry 30 and extrema detection circuitry 32. Histogram generation circuitry 30 may accumulate pixel data received from image sensor 16 into one or more histograms of pixel data. Histograms of pixel data generated by circuitry 30 may be used during pixel data processing (e.g., for performing image correction operations on the pixel data). For example, histograms of pixel data generated by circuitry 30 may be used to perform auto-exposure operations, exposure correction operations, white-balance operations, gamma correction operations, or any other desired image processing operations on the pixel data. Extrema detection circuitry 32 may process received pixel data to determine extrema for the pixel data generated by image sensor 16. For example, circuitry 32 may detect a pixel value having a maximum or minimum magnitude of the received pixel data.

Pixel data processing circuitry 28 may be coupled to processing circuitry 24 via line 31. Pixel data processing circuitry 28 may provide pixel data to processing circuitry 24 over line 31 (e.g., processing circuitry 28 may provide raw pixel data or processed pixel data such as histograms of pixel data and extremum pixel values to processing circuitry 24). Processing circuitry 24 may provide control signals to pixel data processing circuitry 28 over line 31. For example, processing circuitry 24 may provide control signals to histogram generation circuitry 30 that instruct circuitry 30 to accumulate selected pixel values to particular bins of a histogram.

Figure 2:
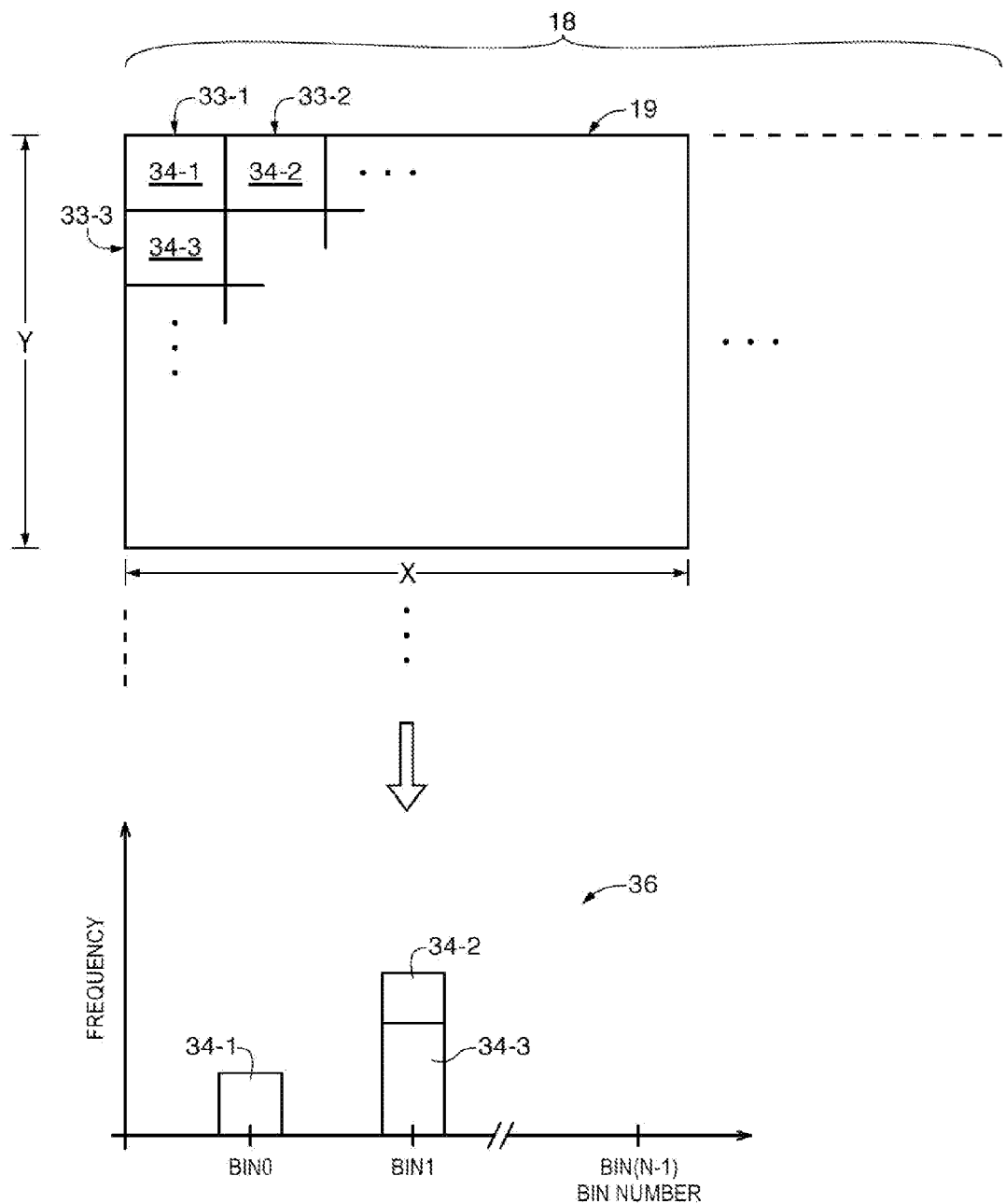
FIG. 2 is an illustrative diagram showing how pixel data captured by a patch of image sensor pixels arranged in pixel rows and columns may be added to bins of a pixel value histogram in accordance with an embodiment of the present invention.

FIG. 2 is an illustrative diagram showing how histogram accumulation circuitry 30 may accumulate pixel values generated by pixel array 18 into a histogram of pixel data. As shown in FIG. 2, pixel array 18 may include a number of image pixels 33 (e.g., a first image pixel 33-1, a second image pixel 33-2, a third image pixel 33-3, etc.). Each image pixel 33 may generate a respective pixel value 34. For example, first image pixel 33-1 may generate a first pixel value 34-1, second image pixel 33-2 may generate a second pixel value 34-2, and third image pixel 33-3 may generate a third pixel value 34-3.

Histogram accumulation circuitry 30 may accumulate a histogram of pixel values generated by image pixels 33 that are located in patch 19 of pixel array 18. Pixel patch 19 may include any desired number of image pixels 33 in array 18 (e.g., patch 19 may include some of the pixels in array 18 or all of the pixels in array 18). Image pixel values 34 that are generated by the image pixels 33 in patch 19 may sometimes be referred to herein collectively as pixel value patch P. In the example of FIG. 2, pixel patch 19 includes image pixels 33 that are arranged in an array having X columns and Y rows (e.g., pixel patch 19 includes X*Y image pixels 33). A pixel value patch generated by pixel patch 19 may thereby include an array of pixel values 34 having X columns and Y rows (e.g., pixel value patch P includes X*Y pixel values 34).

As shown in FIG. 2, histogram generation circuitry 30 may accumulate pixel values generated by patch 19 into a histogram 36 having N bins (e.g., having a first bin BIN0, a second bin BIN1, an $N^{th}$ bin BIN(N−1), etc.). Histogram generation circuitry 30 may receive control signals that identify a particular bin in histogram 36 in which each pixel value 34 is to be accumulated. In the example of FIG. 2, processing circuitry 30 accumulates pixel value 34-1 into bin BIN0 and accumulates pixel values 34-2 and 34-3 into bin BIN1. The example of FIG. 2 is merely illustrative. In general, histogram generation circuitry 30 may accumulate pixel values 34 captured by pixel patch 19 into any desired bins of histogram 36. Histogram 36 may include any desired number of bins. Patch 19 may include any number of pixels 33 arranged in any desired pattern.

Figure 3:
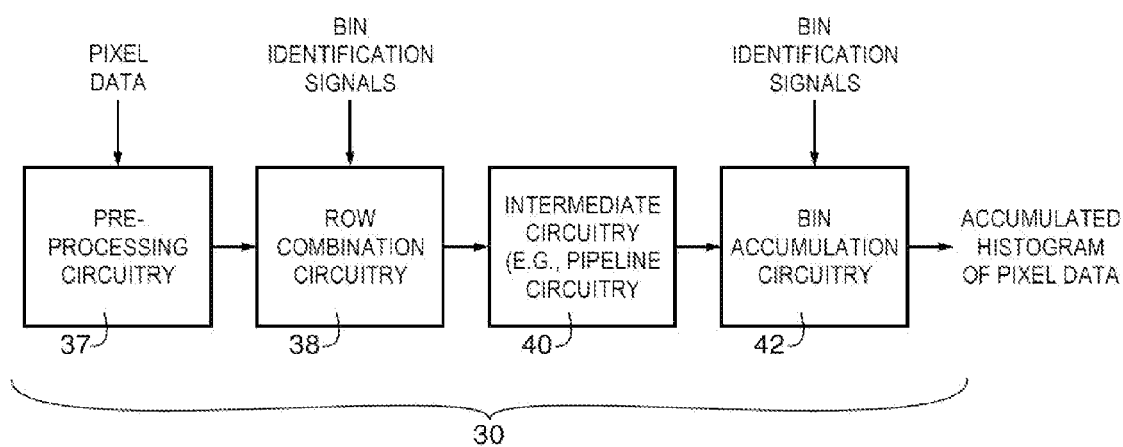
FIG. 3 is a diagram of illustrative pixel data histogram generation circuitry having row combination circuitry, intermediate circuitry, and bin accumulation circuitry for generating an accumulated histogram of pixel values in accordance with an embodiment of the present invention.

As shown in FIG. 3, histogram generation circuitry 30 may include pre-processing circuitry 37, row combination circuitry 38, intermediate processing circuitry 40, and bin accumulation circuitry 42. Pre-processing circuitry 37 may receive pixel data from image pixel patch 19. If desired, pre-processing circuitry 37 may include multiplier circuitry for multiplying received pixel data, image processing circuitry such as slope detection circuitry (e.g., to detect changes in pixel value generated across patch 19), weighting circuitry for applying linear weights to received pixel data, etc.

Pre-processing circuitry 37 may pass pixel data to row combination circuitry 38. Row combination circuitry 38 may include input gate circuitry and adder circuitry. Circuitry 38 may identify one or more subsets of pixel values generated by patch 19 (e.g., identified subsets of pixel values may sometimes be referred to as segments of pixel values in patch 19). For example, each pixel value subset may include pixel values generated by a subset of the rows in patch 19 (e.g., the subset of rows may be less than the number of rows Y in pixel patch 19). Row combination circuitry 38 may accumulate a respective histogram of pixel values for each subset of pixel values generated by patch 19. For example circuitry 38 may receive a respective pixel value from image pixels in each row of a particular column of patch 19. Circuitry 38 may identify a subset of pixel values generated by that column of patch 19 (e.g., pixel values generated by image pixels from a subset of the rows in the corresponding column of patch 19). Circuitry 38 may add pixel values in each identified subset to a respective histogram of pixel values.

Histograms that are generated using pixel values from a subset of the pixel rows in a given column of patch 19 may sometimes be referred to herein as sub-histograms of pixel values. By generating sub-histograms of pixel values for patch 19, row combination circuitry 38 may reduce the number of logic gates that are used to generate a histogram of pixel values for each pixel in patch 19 (e.g., relative to circuitry that generates a single histogram for each pixel in patch 19). Row combination circuitry 38 may receive bin identification signals from processing circuitry 24. Bin identification signals received by row combination circuitry 38 may identify the bins in which to accumulate the pixel values for each sub-histogram. For example, the bin identification signals may instruct circuitry 38 to add pixel values generated by a pixel in a first row and column of patch 19 to a first sub-histogram bin, may instruct circuitry 38 to add pixel values generated by a pixel in a third row of the first column of patch 19 to a second sub-histogram bin, etc. In general, the bin identification signals may instruct circuitry 38 to add each pixel value in patch 19 to any desired sub-histogram bin (e.g., the bin identification signals may instruct circuitry 38 to add a single pixel value to a given bin, multiple pixel values to a given bin, all pixel values to a given bin, no pixel values to a given bin, etc.).

As an example, pixel patch 19 may have 21 rows and 21 columns of pixels (e.g., X and Y of FIG. 2 are equal to 21) that generates a pixel value patch having 21 rows and 21 columns of pixel values. Row combination circuitry 38 may receive pixel values from each row of a given column of patch 19 (e.g., circuitry 38 may receive 21 pixel values each from a corresponding pixel row of the first column of patch 19). Circuitry 38 may separate the pixel values into three subsets of seven pixel values. Circuitry 38 may generate three pixel value sub-histograms each including the seven pixel values from the corresponding pixel value subset. For example, circuitry 38 may accumulate the seven pixel values from the first subset of pixel values into the bins of a first sub-histogram, may accumulate the seven pixel values from the second subset of pixel values into the bins of a second sub-histogram, and may accumulate the seven pixel values from the third subset of pixel values into the bins of a third sub-histogram. In this way, multiple sub-histograms of pixel values may be generated for a given column of pixel data.

Row combination circuitry 38 may pass each sub-histogram of pixel values to intermediate processing circuitry 40. If desired, intermediate processing circuitry may include pipeline circuitry such as a one or more pipeline registers. Intermediate circuitry 40 may pass the sub-histograms of pixel values to bin accumulation circuitry 42.

Bin accumulation circuitry 42 may receive sub-histograms of pixel values from intermediate circuitry 40. Bin accumulation circuitry 42 may include input gate circuitry, adder circuitry, and bin accumulation module circuitry. Bin accumulation circuitry 42 may combine each received sub-histogram of pixel values to accumulate a histogram of pixel values generated by each pixel in patch 19 (sometimes referred to herein as a complete histogram or an accumulated histogram of pixel values). For example, bin accumulation circuitry 42 may combine the pixel values in each bin from the received sub-histograms to generate the accumulated histogram of pixel values (e.g., circuitry 42 may accumulate pixel values from the first bin of each sub-histogram into the first bin of the accumulated histogram, may accumulate pixel values from the $N^{th}$ bin of each sub-histogram into the $N^{th}$ bin of the accumulated histogram, etc.). Bin accumulation circuitry 42 may receive bin identification signals from processing circuitry 24 that identify the bins in which to accumulate the pixel values of the accumulated histogram.

In the scenario where pixel values from a single column of patch 19 are received by row combination circuitry 38, row combination circuitry 38 may subsequently receive pixel values from each pixel row of additional columns in patch 19. If desired, row combination circuitry 38 may sequentially generate sub-histograms of pixel values for each column of patch 19. For example, row combination circuitry 38 may receive pixel values from a single column of patch 19 during a single clock cycle of histogram generation circuitry 30. Row combination circuitry 38 may receive pixel values from each column of patch 19 after X clock cycles. Bin accumulation circuitry 42 may add the pixel values in each sub-histogram associated with the additional columns of patch 19 to the accumulated histogram. In the example where patch 19 has 21 rows and columns of pixels, bin accumulation circuitry may accumulate pixel values using 63 sub-histograms of pixel values (21 columns*3 sub-histograms per column) into the accumulated histogram (e.g., over 21 clock cycles of histogram generation circuitry 30). Bin accumulation circuitry 42 may output the accumulated histogram to processing circuitry 24. If desired, the accumulated histogram may be used to perform additional image processing operations on pixel data captured by image sensor 16.

Figure 4:
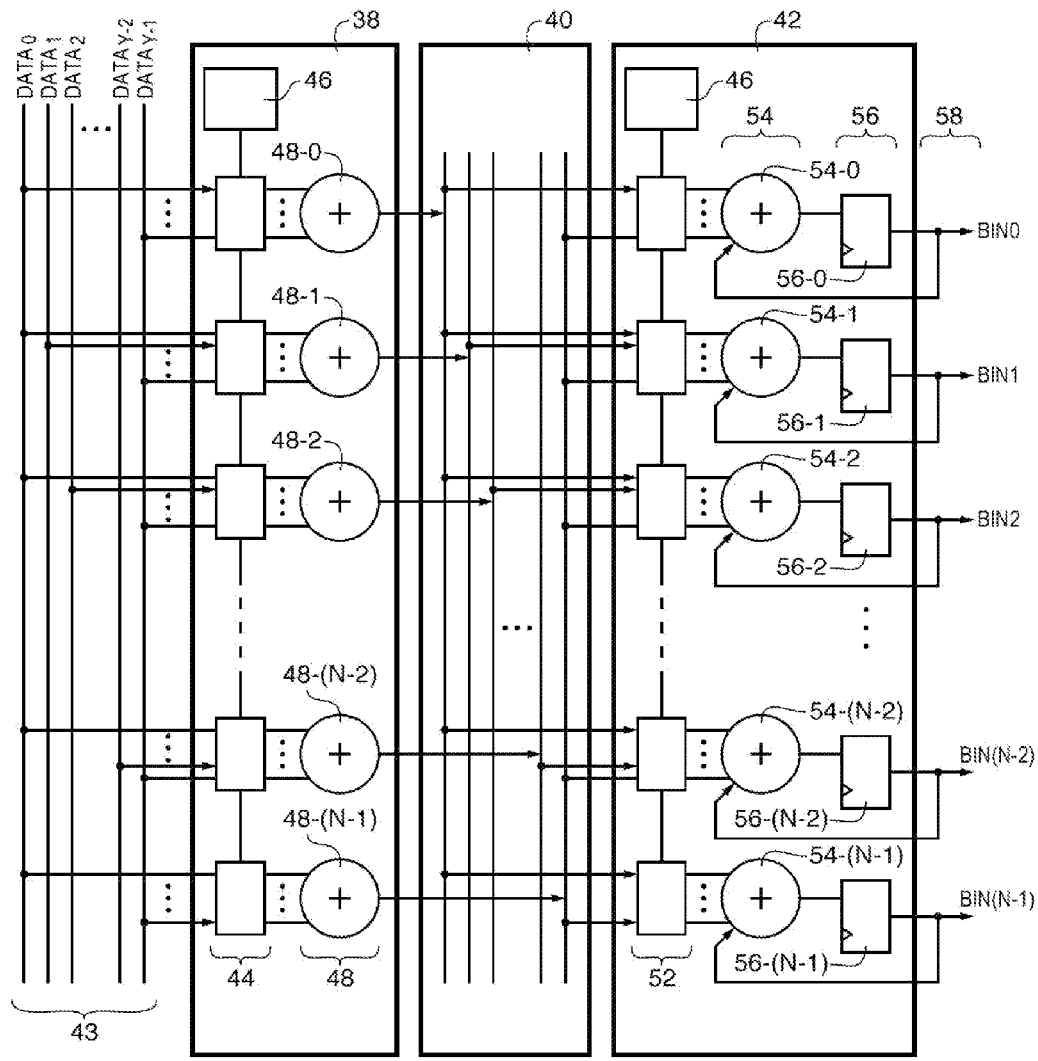
FIG. 4 is a circuit diagram of illustrative pixel data histogram generation circuitry for adding pixel values captured by a patch of image sensor pixels to multiple sub-histograms of pixel values prior to accumulating the sub-histograms into an accumulated histogram of pixel values in accordance with an embodiment of the present invention.

FIG. 4 is an illustrative circuit diagram of histogram generation circuitry such as histogram generation circuitry 30. Histogram generation circuitry 30 may receive pixel values from each row of patch 19 over lines 43 simultaneously. In the example of FIG. 4, row combination circuitry 38 may receive Y pixel values each from a given one of the Y rows in pixel patch 19. As shown in FIG. 4, circuitry 38 receives a first pixel value $data_0$ from a first row of patch 19, a second pixel value $data_1$ from a second row of patch 19, etc.

As shown in FIG. 4, row combination circuitry 38 may include bin selection circuitry such as bin identification decoder circuitry 46, input logic circuitry such as input gate circuitry 44, and adder circuitry such as adder circuitry 48. Row combination circuitry 38 may separate the received pixel values into multiple sub-sets of pixel values. Input gate circuitry 44 may receive the pixel values over lines 43. Input gate circuitry 44 may include a number of logic gates (e.g., logic AND gates, logic OR gates, logic exclusive-OR gates, etc.). Pixel values may be passed from input gates 44 to adder circuitry 48. Adder circuitry 48 may include a number of adder circuits (e.g., a first adder circuit 48-0, a second adder circuit 48-1, etc.). If desired, each adder circuit in adder circuitry 48 may receive pixel values from a corresponding subset of pixels in patch 19. Each adder circuit in adder circuitry 48 may add received pixel values to a corresponding bin of a particular sub-histogram (e.g., adder circuitry 48 may generate a respective sub-histogram of pixel values for each subset of pixel values and each adder circuit in circuitry 48 may add pixel values to a particular sub-histogram bin). For example, pixel values from every four rows of patch 19 may be added to a respective sub-histogram, pixel values from every ten rows of patch 19 may be added to a respective sub-histogram, pixel values from even numbered rows and odd numbered rows of patch 19 may be added to respective sub-histograms, or pixel values from any desired rows of patch 19 may be added to respective sub-histograms.

Bin identification decoder circuitry 46 may receive bin identification signals from processing circuitry 24 (FIG. 1). Decoder circuitry 46 may identify sub-histogram bins in which each received pixel value is to be added by adder circuitry 48. Decoder circuitry 46 may provide the bin identification signals to input gates 44 and/or adder circuitry 48.

Adder circuitry 48 may pass the sub-histograms of pixel values and the bin selection control signals to bin accumulation circuitry 42 via intermediate circuitry 40. If desired, intermediate circuitry 40 may store sub-histograms of pixel values received from row combination circuitry 38 in one or more pipeline registers. Intermediate circuitry 40 may pass the sub-histograms of pixel values to bin accumulation circuitry 42.

Bin accumulation circuitry 42 may include bin identification decoder circuitry 46, input logic circuitry such as input gates 52, adder circuitry such as adder circuitry 54, and bin accumulation register circuitry 56. Input gates 52 may receive each sub-histogram of pixel values from intermediate register circuitry 40. Decoder circuitry 46 may provide bin identification signals to gate circuitry 52 and/or adder circuitry 54. Sub-histograms of pixel values may be passed from input gates 52 to adder circuitry 54 (e.g., to a first adder 54-0, a second adder 54-1, etc.). If desired, bin identification signals may be received from row combination circuitry 38. Each adder circuit in adder circuitry 54 may add pixel values from each sub-histogram into a respective bin of the accumulated histogram (e.g., as identified by the bin identification signals). For example, adder circuit 54-0 may add the pixel values from bin BIN0 (FIG. 2) in each sub-histogram to BIN0 of the accumulated histogram, adder circuit 54-1 may add pixel values from bin BIN1 in each sub-histogram to bin BIN1 of the accumulated histogram, adder circuit 54-(N−1) may add pixel values from bin BIN(N−1) in each sub-histogram to bin BIN(N−1) of the accumulated histogram, etc. In this way, each bin of the accumulated histogram may include a sum of the pixel values from the corresponding bin in each of the pixel value sub-histograms.

Each adder circuit 54 may pass accumulated pixel values for the corresponding bin of the accumulated histogram to bin accumulation register circuitry 56. Bin accumulation registers 56 may store the corresponding accumulated pixel values (e.g., first bin accumulation register 56-0 may store accumulated pixel values associated with bin BIN0, bin accumulation register 56-1 may store accumulated pixel values associated with bin BIN1, etc.). For example, pixel values from bin BIN0 of a given sub-histogram may be stored in bin accumulation register 56-1 for adding to pixel values from bin BIN0 of a subsequent sub-histogram. In this way, pixel values may be accumulated for each bin of the accumulated histogram.

In the scenario where pixel values from a single column of patch 19 are received by row combination circuitry 38 at a time, accumulated pixel values from sub-histograms corresponding to a given column of patch 19 may be stored in bin accumulation module register 56 for adding to sub-histograms of pixel values generated for the remaining columns of patch 19. Bin accumulation module register 56 may pass the accumulated histogram to processing circuitry 24 over lines 58 (e.g., accumulation register 56-0 may pass accumulated pixel values for bin BIN0 of the accumulated histogram to circuitry 24, register 56-1 may pass accumulated pixel values for bin BIN1 of the accumulated histogram to circuitry 24, etc.). Each bin of the accumulated histogram may include sums of pixel values from each pixel in patch 19 that was identified with that histogram bin (e.g., by the bin selection control signals). By generating multiple pixel value sub-histograms prior to generating an accumulated histogram, histogram generation circuitry 30 may reduce the number of logic gates needed to generate the accumulated histogram and may increase the efficiency of imaging device 10 in comparison with circuitry that generates accumulated histograms directly from the received pixel data.

Figure 5:
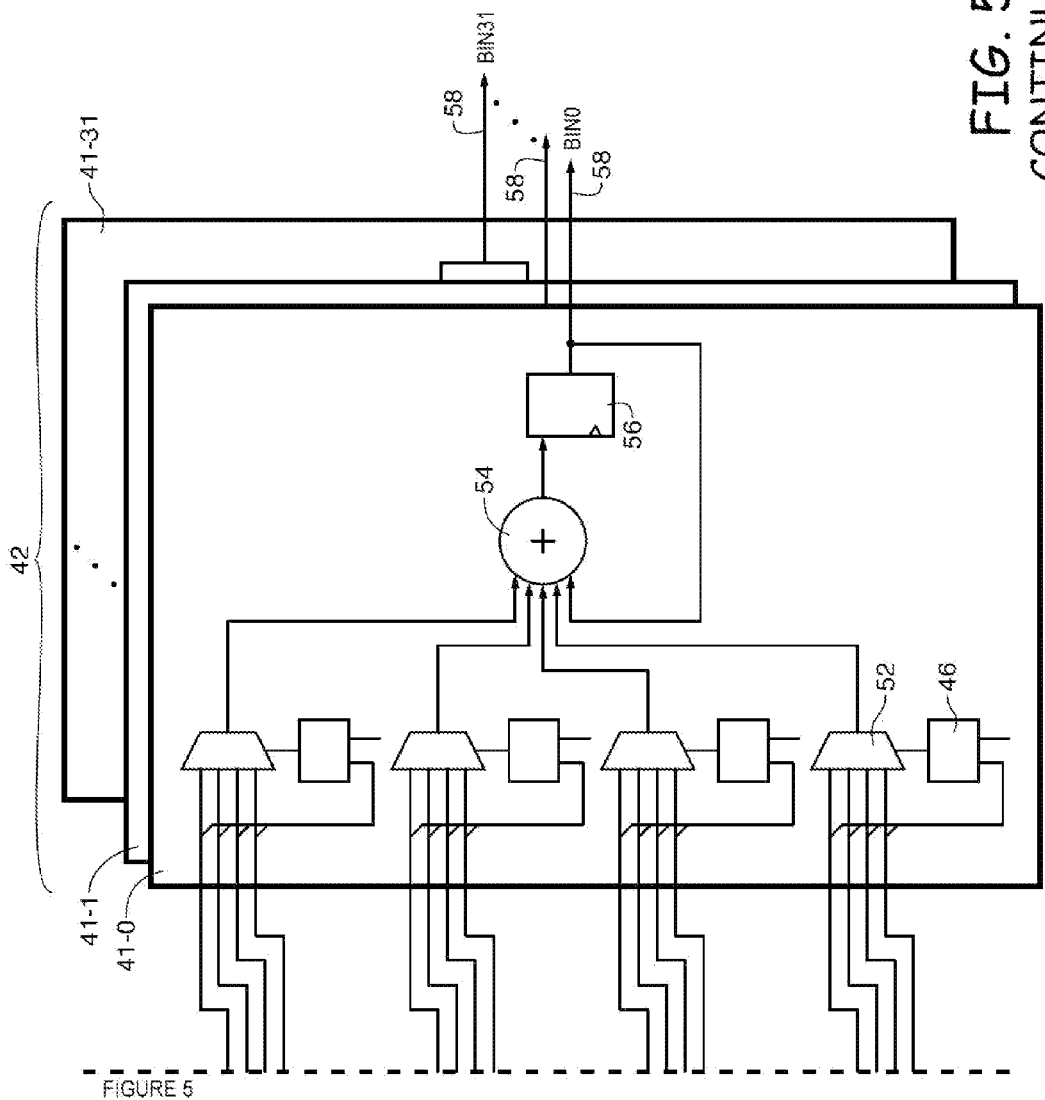
FIG. 5 is a circuit diagram of illustrative pixel data histogram generation circuitry for adding pixel values captured by 16 rows of image sensor pixels to multiple sub-histograms prior to generating an accumulated histogram in accordance with an embodiment of the present invention.

In one suitable arrangement, image pixel patch 19 may have 16 rows of pixels. Histogram generation circuitry 30 may receive 16 pixel values each from a corresponding row of patch 19. Histogram generation circuitry 30 may generate an accumulated histogram having 32 bins using the received pixel values. As shown in FIG. 5, row combination circuitry 38 may include four row combination modules 39 (e.g., a first module 39-0, a second module 39-1, etc.). Each row combination module 39 may include input gating 44, bin identification decoder circuitry 46, and adder circuitry 48. Each row combination module 39 receives pixel values from a corresponding four rows of patch 19. For example, first row combination module 39-0 receives pixel values from rows 0-3 of the patch 19 (e.g., pixel values data_0, data_1, data_2, and data_3), second row combination module 39-1 receives pixel values from rows 4-7 of patch 19, third row combination module 39-2 receives pixel values from rows 8-11 of the pixel subset, and fourth row combination module 39-3 receives pixel values from rows 12-15 of the pixel subset. Each row combination module 39 may, if desired, be formed on separate integrated circuits or on a single integrated circuit. Each row combination module 39 may add the four received pixel values to a respective sub-histogram of pixel values.

Bin identification decoder circuitry 46 in each module 39 may receive bin identification signals bin_id (e.g., a first bin identification signal bin_id_0, a second bin identification signal bin_id_1, etc.) from processing circuitry 24. Decoder circuitry 46 may provide the bin identification signals to gate circuitry 44 and to adder circuitry 48. Adder circuitry 48 may add the received pixel values to corresponding sub-histograms based on the bin identification signals. For example, first row combination module 39-0 may accumulate pixel values received from rows 0-3 of patch 19 to the bins of a first sub-histogram (e.g., the bin identification signals may instruct gate circuitry 44 and adder circuitry 48 to add each pixel value to a selected bin of the first sub-histogram), second row combination module 39-1 may accumulate pixel values received from rows 4-7 of patch 19 to the bins of a second sub-histogram, third row combination module 39-2 may accumulate pixel values received from rows 8-11 of patch 19 to the bins of a third sub-histogram, and fourth row combination 39-3 may accumulate pixel values received from rows 12-15 of patch 19 to the bins of a fourth sub-histogram.

The sub-histograms of pixel values may be passed to bin accumulation circuitry 42 via intermediate circuitry 40. Bin accumulation circuitry 42 may include multiple bin accumulation modules 41 each corresponding to a respective bin in the accumulated histogram. In the example of FIG. 5, bin accumulation circuitry 42 includes 32 bin accumulation modules 41 (e.g., a first bin accumulation module 41-0 for handling pixel values in bin BIN0 of the accumulated histogram, a second bin accumulation module 41-2 for handling pixel values in bin BIN1 of the accumulated histogram, etc.). Each bin accumulation module 41 may accumulate pixel values from the received sub-histograms into a respective bin of the accumulated histogram.

Each bin accumulation module 41 may include bin identification decoder circuitry 46, input gate circuitry 52, adder circuitry 54, and bin accumulation register circuitry 56. If desired, input gate circuitry 52 may include one or more multiplexer circuits. Input gate circuitry 52 may receive pixel value sub-histograms from intermediate register circuitry 40. Bin identification signals received from decoder circuitry 46 may control input gates 52 so pixel values in each bin of the received sub-histograms are passed to corresponding adder circuit 54. Adder circuitry 54 and bin accumulation register circuitry 56 may accumulate pixel values from each sub-histogram bin into the corresponding accumulated histogram bin. Bin accumulation circuitry 42 may output the accumulated histogram on lines 58 (e.g., circuitry 42 may output accumulated pixel values for each of the 32 bins in the accumulated histogram over lines 58).

In the example of FIG. 5, gate circuitry 52 and adder circuitry 54 in first bin accumulation module 41-0 may accumulate pixel values from bin BIN0 of each of the received sub-histograms into bin BIN0 of the accumulated histogram, second bin accumulation module 41-1 may accumulate pixel values from bin BIN1 of each of the received sub-histograms into bin BIN1 of the accumulated histogram, thirty-second bin accumulation module 41-31 may accumulate pixel values from bin BIN31 of each of the received sub-histograms into bin BIN31 of the accumulated histogram, etc.

Figure 6:
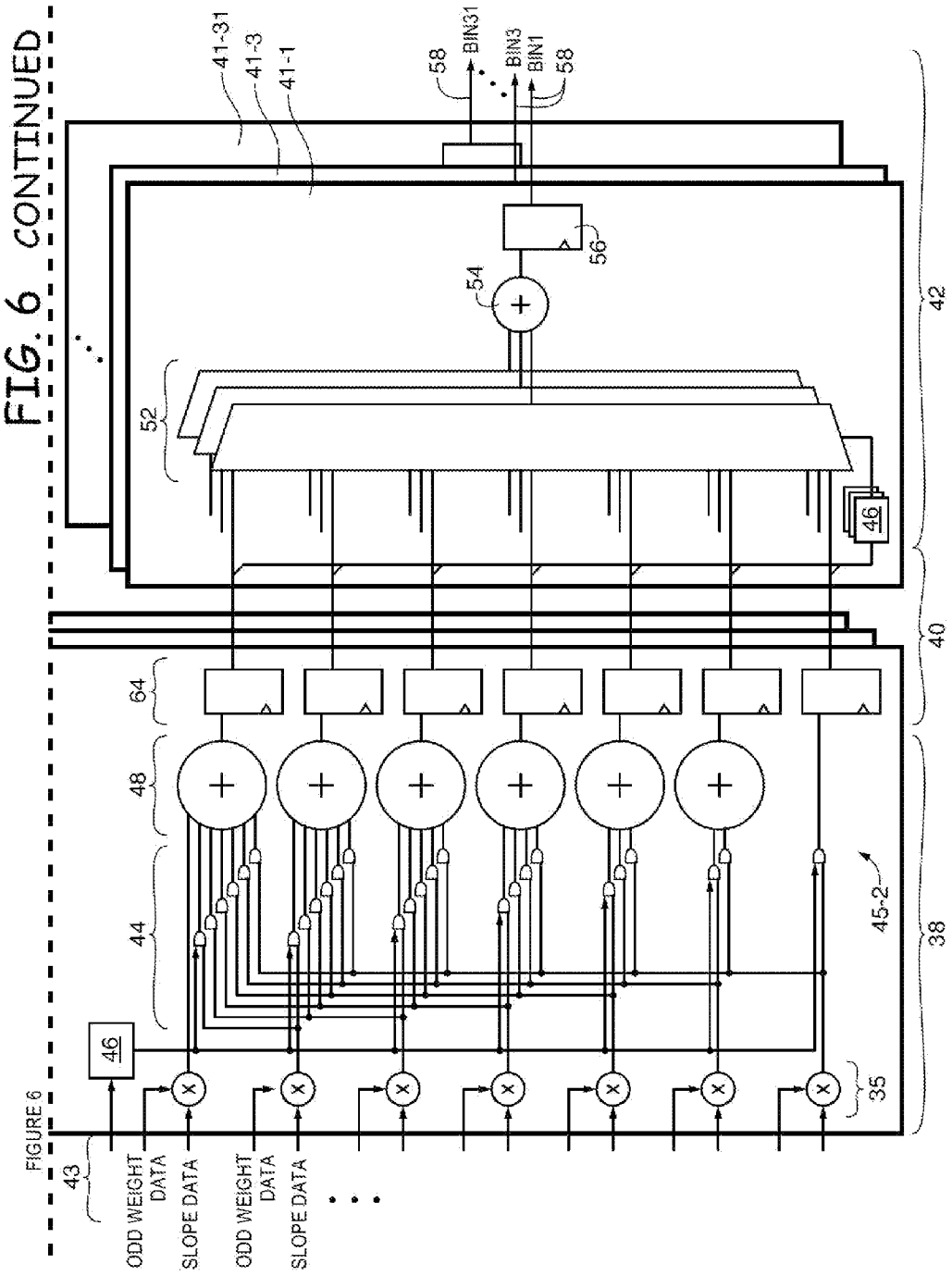
FIG. 6 is a circuit diagram of illustrative pixel data histogram generation circuitry for accumulating weighted pixel luma slope values to an accumulated histogram in accordance with an embodiment of the present invention.

In another arrangement, pixel data received by row combination circuitry 38 may include weighted pixel luma slope values. For example, pre-processing circuitry 37 may compute pixel luma values based on pixel data received from image pixel patch 19. Pre-processing circuitry 37 may compute pixel luma slope values based on the difference in computed pixel luma values across patch 19. Pre-processing circuitry 37 may compute a weighting value for each of the pixel luma slope values (e.g., odd pixel weight data and even pixel weight data) based on the location of the corresponding pixel 33 in patch 19. In the example of FIG. 6, pixel patch 19 includes 21 rows of pixels.

If desired, row combination circuitry 38 may add each pixel value to multiple bins in each sub-histogram. In the example of FIG. 6, row combination circuitry 38 includes three row combination modules 39-0, 39-1, and 39-2. Each row combination module 39 includes an even bin combination module 45-1 and an odd bin combination module 45-2. Each even bin combination module 45-1 includes decoder circuitry 46, gate circuitry 44, adder circuitry 48, and multiplier circuitry 35. Even bin combination module 45-1 may accumulate pixel data to even numbered sub-histogram bins (e.g., bins BIN0, BIN2, BIN4, BIN30 etc.). Each row combination module 39 includes an odd bin combination module 45-2 that includes decoder circuitry 46, gate circuitry 44, adder circuitry 48, and multiplier circuitry 35. Odd bin combination module 45-2 may accumulate pixel data to odd numbered sub-histogram bins (e.g., bins BIN1, BIN3, BIN31, etc.). If desired, pixel values from a given row of patch 19 may be provided to both even module 45-1 and odd module 45-2 (e.g., so that each pixel value may be accumulated in both an odd bin and an even bin of the corresponding sub-histogram). In this way, each row combination module 39 may output a sub-histogram having 14 pixel values (e.g., circuitry 38 may provide sub-histograms having twice as many accumulated pixel values as there are pixel rows in patch 19).

Multiplier circuitry 35 in each row combination module 39 may receive pixel luma slope data and weight data from pre-processing circuitry 37. Multiplier circuitry 35 multiply pixel luma slope values associated with each row in patch 19 with a respective weight value to generate weighted pixel luma slope values (e.g., pixel luma slope values may be multiplied with odd weight data for adding to odd numbered sub-histogram bins and may be multiplied with even weight data for adding to even numbered sub-histogram bins). Multiplier circuitry 35 may pass the weighted pixel luma slope values to gate circuitry 44 for accumulation into sub-histograms of weighted pixel luma slope values.

Each row combination module 39 may generate a respective sub-histogram of weighted pixel luma slope values. In the example of FIG. 6, three sub-histograms of weighted pixel luma slope values are created (e.g., row combination module 39-0 may generate a first sub-histogram, row combination module 39-1 may generate a second sub-histogram, and row combination module 39-2 may generate a third sub-histogram), each having as many as 14 weighted pixel luma slope values (e.g., each received weighted pixel luma slope value may be accumulated in both an even bin and an odd bin of the corresponding sub-histogram).

Intermediate register circuitry 40 may include storage registers 64 (sometimes referred to as pipeline registers, a pipeline stage, or a storage stage). If desired, accumulated weighted pixel luma slope values in each sub-histogram bin may be stored in a corresponding storage register 64. In this way, the weighted pixel luma slope sub-histograms may be pipelined (e.g., to allow sufficient time for the pixel luma slope weight values to be multiplied with the corresponding pixel luma slope values). Pipeline registers 64 may pass the sub-histograms of weighted pixel luma slope values to bin accumulation circuitry 42.

Bin accumulation circuitry 42 may include multiple bin accumulation modules 41 (e.g., bin accumulation modules 41-0, 41-1, 41-30, etc.). Gate circuitry 52, adder circuitry 54, and bin accumulation register circuitry 56 in each module 41 may accumulate weighted pixel luma slope values from each sub-histogram into a respective bin of the accumulated histogram. Bin accumulation modules associated with even numbered bins (e.g., bin accumulation modules 41-0, 41-2, etc.) may receive weighted pixel luma slope values in even sub-histogram bins from even bin combination modules 45-1 and bin accumulation modules associated with odd numbered bins (e.g., bin accumulation modules 41-1, 41-3, etc.) may receive weighted pixel luma slope values in odd sub-histogram bins from odd bin combination modules 45-2. Bin accumulation circuitry 42 may output the accumulated histogram on lines 58 (e.g., each bin accumulation module 41 may output the weighted pixel luma slope values associated with the corresponding bin in the accumulated histogram).

Figure 7:
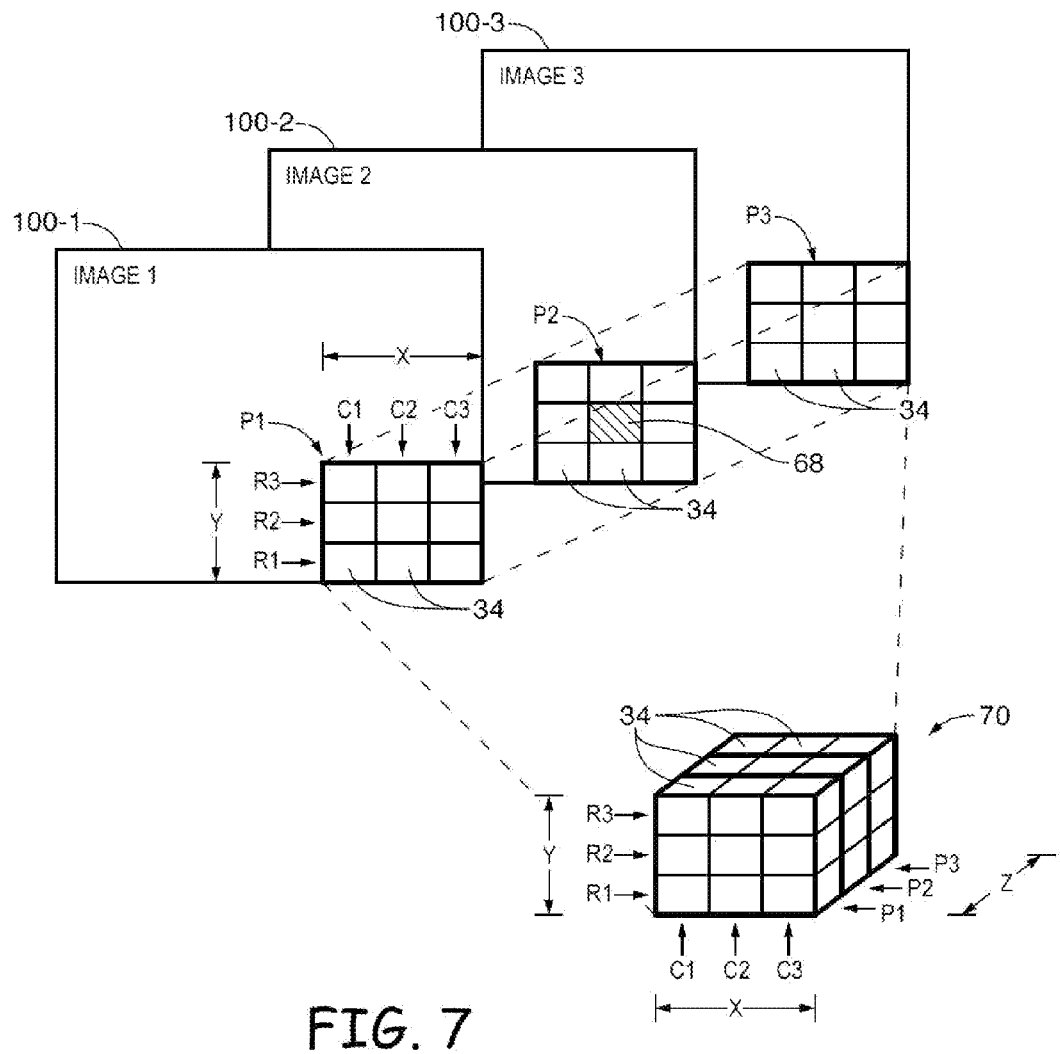
FIG. 7 is an illustrative diagram showing how pixel value extrema detection circuitry of the type shown in FIG. 1 may identify a set of pixel value patches in pixel data received from an image sensor for determining extremum pixel values in accordance with an embodiment of the present invention.

FIG. 7 is an illustrative diagram showing how extrema detection circuitry 32 in pixel data processing circuitry 28 (FIG. 1) may process a set of two-dimensional pixel value patches to determine whether a given pixel value in the set of pixel value patches is an extremum pixel value (e.g., a maximum or minimum pixel value) of the set of pixel value patches. As shown in FIG. 7, extrema detection circuitry 32 may obtain three images 100 (e.g., a first image 100-1, a second image 100-2, and a third image 100-3) from the pixel data received from image sensor 16. If desired, each image 100 may be captured by image sensor 16 at a respective time (e.g., images 100 may be a sequentially captured image frames). In another suitable arrangement, each image 100 may be captured at the same time. Each image 100 may be pre-processed using pre-processing circuitry in extrema detection circuitry 32. If desired, extrema detection circuitry 32 may process image frame 100-1 to generate images 100-2 and 100-3. For example, images 100-2 and 100-3 may be formed by applying varying amounts of white balance, blur, gamma correction, or any other desired image processing operations on image 100-1 (e.g., for images captured at the same time or at different times by image sensor 16).

Each image 100 may include multiple image pixel values 34. Extrema detection circuitry 32 may identify two-dimensional patches P of pixel values 34 in each image 100 (e.g., patches P of pixel values 34 generated by pixels 33 in patch 19 of FIG. 2). For example, circuitry 32 may identify a first pixel patch P1 in image 100-1, a second pixel patch P2 in image 100-2, and a third pixel patch P3 in image 100-3. In general, pixel patches P may include any number of pixel values arranged in any pattern (e.g., circuitry 32 may identify patches of the same size or of different sizes for each image 100). In the example of FIG. 7, each pixel patch P may include number of columns X and a number of rows Y of pixel values 34. In the example of FIG. 7, each pixel patch P includes three pixel columns C1, C2, and C3 and three pixel rows R1, R2, and R3 (e.g., X and Y are each equal to three). In another suitable arrangement, pixel patches P may include all pixel values in images 100.

Circuitry 32 may process the set of pixel value patches P. The set of pixel value patches P may sometimes be referred to herein collectively as three-dimensional pixel value block 70. Block 70 may include pixel values 34 from the X columns and Y rows of a number Z of pixel value patches P. The number of columns X and the number of rows Y in block 70 may be equal to the number of columns X and the number of rows Y in each pixel value patch P. The number of pixel value patches Z may, for example, be equivalent to the number of images 100. As shown in FIG. 7, circuitry 32 may process a set of pixel value patches P1, P2, and P3. In this example, pixel value block 70 includes 27 pixel values (e.g., nine pixel values from each of pixel value patches P1, P2, and P3). Block 70 may thereby include the three pixel value columns C1, C2, and C3 and the three pixel value rows R1, R2, and R3 from patches P1, P2, and P3 (e.g., block 70 may include nine columns of pixel values from a set of three pixel value patches).

The example of FIG. 7 is merely illustrative. If desired, pixel value patches of any size and pattern may be identified in any number of images 100. Pixel value block 70 may include any number of pixel values and may have any shape. For example, pixel value block 70 may include nine pixel values from five pixel patches, may include five pixel values from nine pixel patches, may include pixel values from circular pixel patches, etc.

Extrema detection circuitry 32 may process pixel value block 70 to determine whether a given pixel value in block 70 is an extremum pixel value of pixel block 70 (e.g., to determine whether a given pixel value in block 70 has a maximum magnitude or a minimum magnitude of all pixel values in block 70). In the example of FIG. 7, extrema detection circuitry 32 processes pixel value block 70 to determine whether central pixel value 68 (e.g., the pixel value from row R2, column C2 of patch P2) is a maximum or minimum pixel value for block 70. The maximum or minimum pixel values may be used, for example, for interest point detection for a three-dimensional space of pixel data (e.g., in which unique maximum or minimum pixel values in the pixel data give the location of a pixel data interest point).

Extrema detection circuitry 32 may include comparator circuitry for comparing pixel values in block 70. Comparator circuitry in extrema detection circuitry 32 may include one or more comparator circuits that each compares the magnitude of two pixel values 34. For example, a particular comparator circuit may receive two pixel values and determine which of the received pixel value has a greater magnitude. In some scenarios, separate comparator circuits may be used to compare each pixel value in block 70 to central pixel value 68 (e.g., a respective comparator circuit may be used to compare each pixel value in block 70 to pixel value 68 to determine whether pixel value 68 is a maximum or minimum pixel value). However, forming a separate comparator circuit for each pixel value may reduce the speed and efficiency of pixel data processing circuitry 28. It may therefore be desirable to be able to provide improved extrema detection circuitry for pixel data processor 28.

Figure 8:
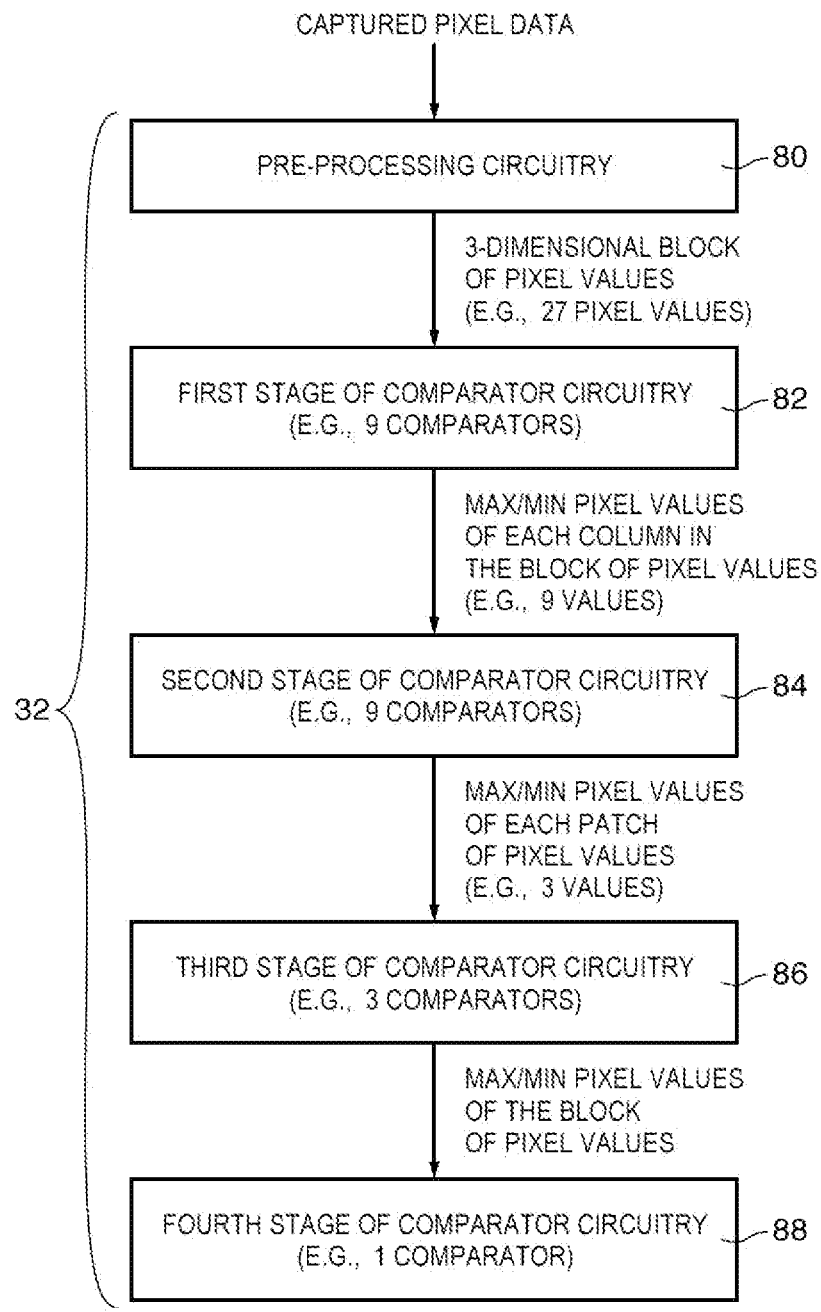
FIG. 8 is a block diagram of illustrative pixel value extrema detection circuitry having multiple stages of comparator circuitry for identifying maximum or minimum pixel values in accordance with an embodiment of the present invention.

Comparator circuitry in extrema detection circuitry 32 may include a number of comparator stages. If desired, each comparator stage may be used to compare pixel values across columns, rows, and/or patches of block 70. FIG. 8 is an illustrative block diagram of extrema detection circuitry 32. As shown in FIG. 8, extrema detection circuitry 32 may include pre-processing circuitry such as pre-processing circuitry 80, a first stage of comparator circuitry 82, a second stage of comparator circuitry 84, a third stage of comparator circuitry 86, and a fourth stage of comparator circuitry 88.

Pre-processing circuitry 80 may receive captured pixel data from image sensor 80. Pre-processing circuitry 80 may obtain images 100 using the received pixel data. For example, circuitry 80 may receive pixel data corresponding to image 100-1 from image sensor 16, may generate image 100-2 by applying a relatively low amount of blur to image 100-1, and may generate image 100-3 by applying a relatively high amount of blur to image 100-1. In another suitable arrangement, pre-processing circuitry 80 may receive each image 100 from image sensor 16. Pre-processing circuitry 80 may identify a set of pixel value patches P (e.g., a three-dimensional pixel value block such as block 70 of FIG. 7) in the received pixel data. Circuitry 80 may pass the pixel value block to first comparator circuitry stage 82.

First comparator circuitry stage 82 may compare the pixel values in each column of the pixel value block to determine a maximum or minimum pixel value for each column of the pixel value block. First comparator stage 82 may pass the maximum/minimum pixel values from each column of the pixel value block to second comparator stage 84.

Second comparator stage 84 may compare the maximum or minimum pixel values from each column of the pixel value block to determine a maximum or minimum pixel value for each pixel value patch in the block. Second comparator stage 84 may pass the maximum or minimum pixel values from each pixel value patch of the block to third comparator stage 86. Third comparator stage 86 may compare the maximum or minimum pixel values of each pixel value patch in the block to determine a maximum or minimum pixel value of the pixel value block.

Third comparator stage 86 may pass the maximum or minimum pixel value of the pixel block to fourth comparator stage 88. Fourth comparator stage 88 may compare the maximum or minimum pixel value of the pixel value block to a selected pixel value in the block. For example, fourth comparator stage 88 may compare the maximum or minimum pixel value identified for the pixel block to a central pixel value of the block (e.g., a pixel value located at the middle of the block). If the magnitude of the central pixel value is the same as the identified maximum or minimum pixel value of the pixel block, the central pixel value may be identified (labeled) as the maximum/minimum pixel value of the pixel block.

In the example of FIGS. 7 and 8, extrema detection circuitry 32 determines either a maximum or minimum pixel value of the pixel value block. For example, if circuitry 32 is used to determine a minimum pixel value of the block, minimum pixel values of each pixel value column in the block are identified using first comparator stage 82, minimum pixel values of each pixel patch in the block are identified using second comparator stage 84, and a minimum pixel value of the pixel value block is identified using third comparator stage 86. Fourth comparator stage 88 compares the central pixel value in the pixel value block to the minimum pixel value to determine whether the central pixel value is the minimum pixel value of the block (e.g., to determine whether the central pixel value has the smallest magnitude of all pixel values in the pixel value block).

As another example, if circuitry 32 is used to determine a maximum pixel value of the pixel block, maximum pixel values of each pixel column in the block are identified using first comparator stage 82, maximum pixel values of each pixel patch P in the block are identified using second comparator stage 84, and a maximum pixel value of the pixel value block is identified using third comparator stage 86. Fourth comparator stage 88 compares the central pixel value in the pixel value block to the maximum pixel value to determine whether the central pixel value is the maximum pixel value of the pixel value block (e.g., to determine whether the central pixel value has the greatest magnitude of all pixel values in the pixel value block).

Figure 9:
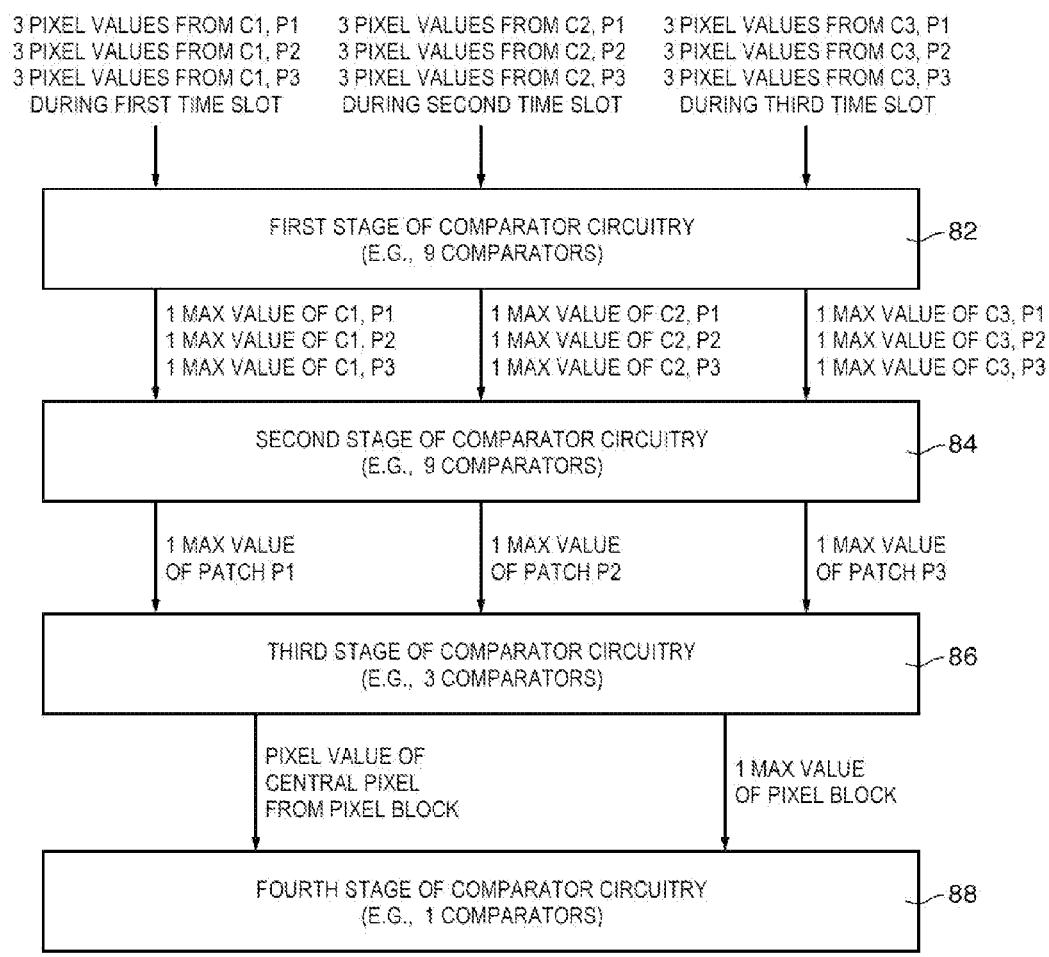
FIG. 9 is a block diagram of illustrative pixel value extrema detection circuitry having comparator circuitry for identifying a minimum or maximum pixel value for a set of three pixel patches that each has three rows and three columns of pixel values in accordance with an embodiment of the present invention.

FIG. 9 is an illustrative block diagram of extrema detection circuitry 32 for determining a maximum pixel value of pixel value block 70 of FIG. 7. As shown in FIG. 8, first comparator circuitry stage 82 may receive three pixel values from each column of pixel value block 70 (e.g., stage 82 may receive the 27 pixel values of block 70 from pre-processing circuitry 79). Stage 82 may compare the three pixel values in each of the nine columns of block 70 to identify nine maximum pixel values. Each maximum pixel value identified by first stage 82 may be a maximum pixel value of the corresponding pixel column. For example, comparator circuitry 82 may compare the pixel values from rows R1, R2, and R3 in column C1 of patch P1 to determine a maximum pixel value for column C1 of patch P1, circuitry 82 may compare the pixel values from rows R1, R2, and R3 in column C2 of patch P1 to determine a maximum pixel value for column C2 of patch P1, circuitry 82 may compare the pixel values from rows R1, R2, and R3 in column C3 of patch P3 to determine a maximum pixel value for column C3 of patch P3, etc.

If desired, comparator circuitry 82 may identify maximum pixel values for each column of patches P1, P2, and P3 during respective time slots. For example, circuitry 82 may identify maximum values for column C1 of patches P1, P2, and P3 during a first time slot, may identify maximum values for column C2 of patches P1, P2, and P3 during a second time slot, and may identify maximum values for column C3 of patches P1, P2, and P3 during a third time slot. In this example, the second time slot may be after the first time slot and the third time slot may be after the second time slot.

In this example, first comparator stage 82 may include nine comparator circuits. A first set of three comparator circuits in stage 82 may identify a maximum pixel value of column C1 in patch P1, a second set of three comparator circuits in stage 82 may identify a maximum pixel value of column C1 in patch P2, and a third set of three comparator circuits in stage 82 may identify a maximum pixel value of column C1 in patch P3 (e.g., each maximum pixel value may be determined simultaneously or sequentially). If desired, the first, second, and third sets of comparator circuits in first stage 82 may subsequently identify the maximum pixel values of columns C2 and C3 in patches P1, P2, and P3 (e.g., the first, second, and third sets of comparator circuits may identify maximum pixel values of column C2 in patches P1, P2, and P3 prior to identifying maximum pixel values of column C3 in patches P1, P2, and P3). In this way, nine respective maximum pixel values may be identified for each of the nine columns in pixel value block 70 using nine comparator circuits.

First comparator stage 82 may pass the nine maximum pixel values of each column in pixel value block 70 to second comparator stage 84. Second comparator stage 84 may compare the maximum pixel values from each column C1, C2, and C3 of each corresponding patch P to determine the maximum pixel value of each patch P (e.g., stage 84 may determine three maximum pixel values each corresponding to a respective pixel value patch P). Second comparator stage 84 may, for example, include nine comparator circuits. A first set of three comparator circuits in second stage 84 may identify a maximum pixel value for patch P1 of block 70 by comparing each of the maximum pixel values of columns C1, C2, and C3 in patch P1. A second set of three comparator circuits in second stage 84 may identify a maximum pixel value of patch P2 by comparing each of the maximum pixel values of columns C1, C2, and C3 in patch P2. A third set of three comparator circuits in second stage 84 may determine a maximum pixel value of patch P3 by comparing each of the maximum pixel values of columns C1, C2, and C3 in patch P3. In this way, respective maximum pixel values may be identified for each of the three patches P1, P2, and P3 in pixel value block 70.

Second comparator stage 84 may pass the three maximum pixel values of patches P1, P2, and P3 to third comparator stage 86. Third comparator stage 86 may, for example, include three comparator circuits. The comparator circuits may identify a maximum pixel value of pixel value block 70 by comparing each of the maximum pixel values of patches P1, P2, and P3.

Third comparator stage 86 may pass the maximum pixel value of pixel value block 70 to fourth comparator stage 88. Fourth comparator stage 88 may, for example, include one comparator circuit. Comparator stage 88 may receive central pixel value 68 from pre-processing circuitry 79. Comparator stage 88 may compare the maximum pixel value of pixel value block 70 to central pixel value 68. If the magnitude of central pixel value 68 is the same as the maximum pixel value identified for block 70, central pixel value 68 may be identified as the maximum pixel value of block 70.

The example of FIG. 9 is merely illustrative. If desired, comparator stages 82, 84, 86, and 88 may be used to determine a minimum pixel value of pixel value block 70. Comparator stages 82, 84, 86, and 88 may be used to identify a maximum or minimum value for a pixel value block having any shape or size. First stage of comparator circuitry 82 may include the same number of comparator circuits as the second stage 84. Third stage of comparator circuitry 86 may include fewer comparator circuits than the first and second stages (e.g., because fewer pixel value comparisons are made by third stage 86), and fourth stage of comparator circuitry 88 may include fewer comparator circuits than third stage 86. In this way, extrema detection circuitry 32 may have fewer comparator circuits and improved speed and efficiency relative to circuitry having separate comparator circuits for each pixel value in the pixel value block. In general, the number of comparator circuits in each stage may depend on the size of pixel value block 70 (e.g., a greater number of comparator circuits may be used for larger pixel value blocks than for smaller pixel value blocks).

Figure 10:
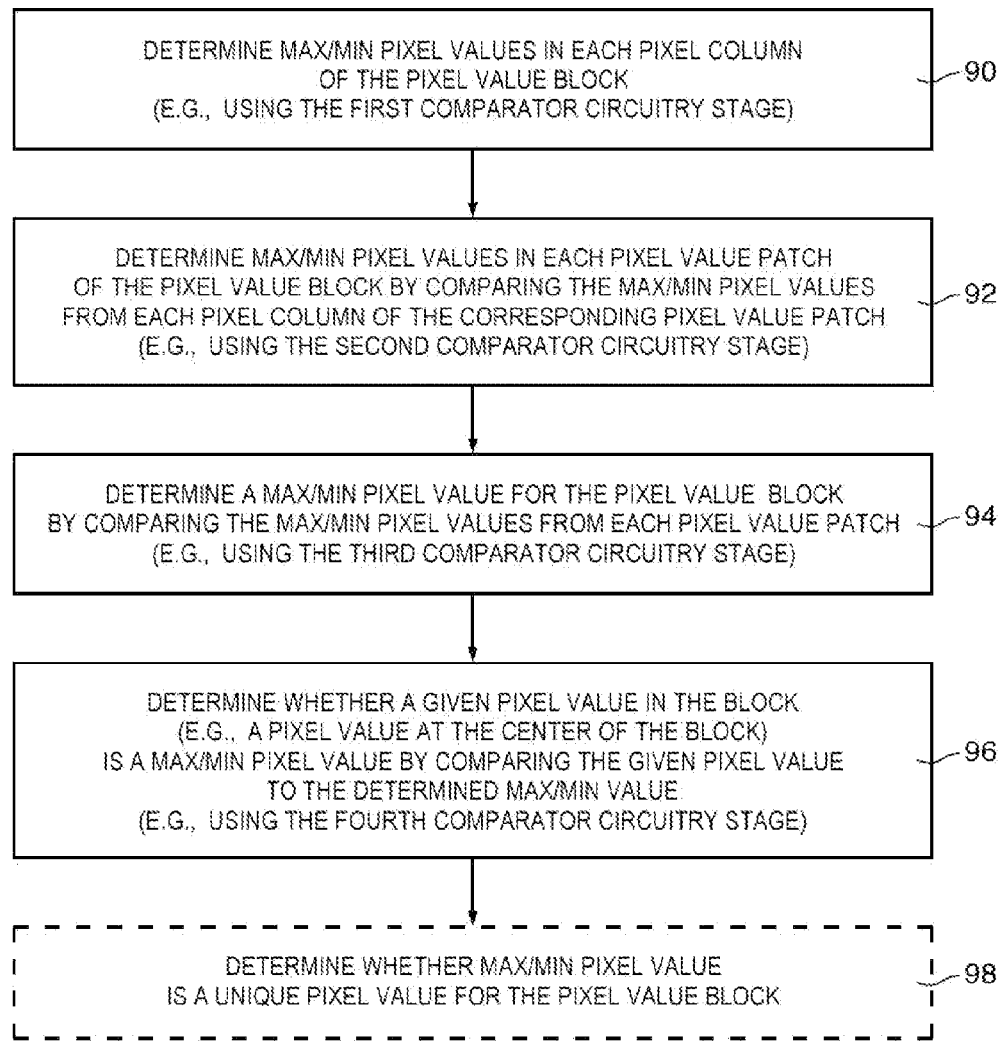
FIG. 10 is a flow chart of illustrative steps that may be used for determining a maximum or minimum pixel value of a set of pixel value patches in accordance with an embodiment of the present invention.

FIG. 10 is a flow chart of illustrative steps that may be performed by extrema detection circuitry 32 to identify an extremum pixel value (e.g., a maximum or minimum pixel value) of a block of pixel values. At step 90, first comparator circuitry stage 82 may identify a respective extremum pixel value of each pixel column in the pixel block (e.g., for each pixel column in a pixel block identified by pre-processing circuitry 79 in pixel data received from image sensor 16). For example, stage 82 may identify respective minimum pixel values for each of the nine columns in pixel block 70 of FIG. 7.

At step 92, second comparator circuitry stage 84 may identify a respective extremum pixel value of each pixel patch in the block of pixel values by comparing the extremum pixel values of each column in the corresponding pixel value patch. For example, second comparator stage 84 may identify respective minimum pixel values for each of the three pixel value patches P in pixel block 70 by comparing the minimum pixel values of each column in the corresponding pixel value patch P.

At step 94, third comparator circuitry stage 86 may identify an extremum pixel value of the block of pixel values by comparing the extremum pixel values of each pixel value patch. For example, third comparator stage 86 may identify a minimum pixel value for pixel value block 70 by comparing the minimum pixel value of each of the three pixel value patches P in block 70.

At step 96, fourth comparator circuitry stage 88 may compare the extremum pixel value of the pixel value block with a central pixel value of the pixel value block. If the central pixel value is the same as the extremum pixel value, the central pixel value may be identified as an extremum pixel value of the pixel block. For example, fourth comparator stage 88 may compare the minimum pixel value of block 70 to central pixel value 68. If central pixel value 68 is the same as the minimum pixel value of block 70, central pixel value 68 may be identified as the minimum pixel value of block 70.

At optional step 98, extrema detection circuitry 32 may determine whether the extremum pixel value of the pixel value block is a unique extremum pixel value. The extremum pixel value of the pixel value block is a unique extremum pixel value if no other pixel values in the pixel value block have the same pixel value as the extremum pixel value. For example, circuitry 32 may determine that a minimum pixel value of pixel value block 70 is not unique if one or more pixel values in block 70 have the same magnitude as the minimum pixel value of pixel value block 70.

As an example, two adjacent pixel values in pixel value block 70 cannot both be a unique maximum or minimum pixel value of pixel block 70 (e.g., because an extremum pixel value is unique only if no other pixel values in block 70 have the same magnitude). In some cases, two adjacent pixel values in block 70 may each be a unique maximum and unique minimum pixel value of block 70. If values of adjacent extremum pixel values in block 70 are compared prior to determining extremum pixel values for the patches of pixel value block 70, further determination of extremum pixel value uniqueness may be omitted.

Figure 11:
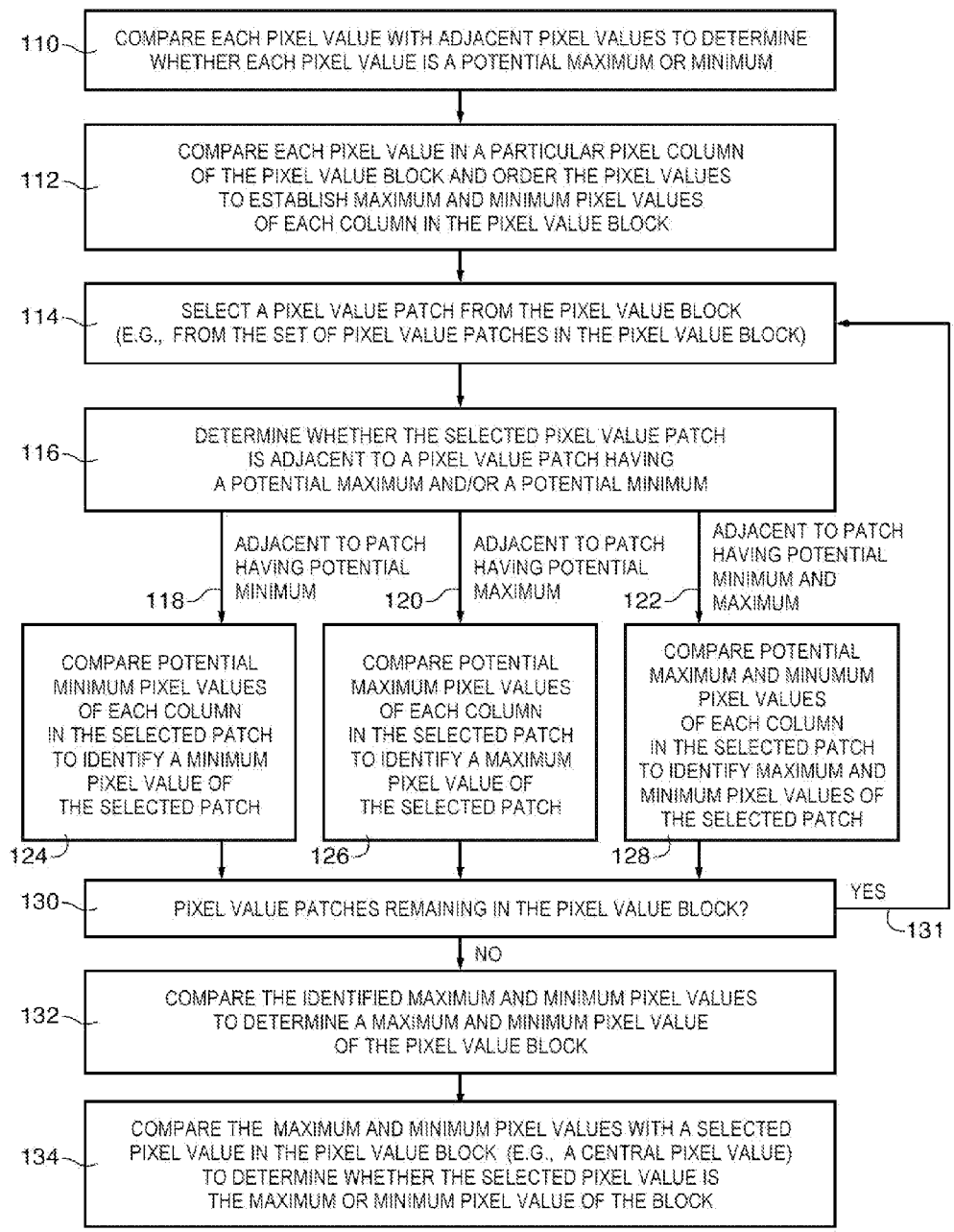
FIG. 11 is a flow chart of illustrative steps that may be used for determining extremum pixel values (e.g., maximum and minimum pixel values) of a set of pixel value patches in accordance with an embodiment of the present invention.

In another suitable arrangement, extrema detection circuitry 32 may determine both maximum and minimum pixel values for block 70. FIG. 11 is a flow chart of illustrative steps that may be performed by extrema detection circuitry 32 to identify maximum and minimum pixel values for pixel block 70.

At step 110, extrema detection circuitry 32 may compare selected pixel values in block 70 with adjacent pixel values in block 70 to determine whether the selected pixel value are a potential maximum or minimum pixel value. For example, if a given pixel value in block 70 is greater than each of the pixel values adjacent to the given pixel value, that pixel value may be identified as a potential maximum pixel value. If a given pixel value is less than each of the adjacent pixel values, that pixel value may be identified as a potential minimum pixel value. If desired, extrema detection circuitry 32 may compare central pixel value 68 to each pixel value adjacent to central pixel value 68 in patches P1 and P3 (e.g., circuitry 32 may compare central pixel value 68 of patch P2 to the central pixel values of patches P1 and P3). If each pixel value adjacent to central pixel value 68 in patches P1 and P3 is greater than central pixel value 68, central pixel value 68 may be identified as a potential minimum pixel value. If desired, the pixel values adjacent to central pixel value 68 may be identified as potential maximum values.

At step 112, extrema detection circuitry 32 may compare each pixel value in each column of pixel value block 70 and may order the pixel values in each column to identify a minimum pixel value and a maximum pixel value for each column of pixel value block 70. If desired, step 112 may be performed by first comparator stage 82 of FIG. 8.

At step 114, extrema detection circuitry 32 may select a pixel value patch P from block 70 for processing.

At step 116, extrema detection circuitry 32 may determine whether the selected pixel value patch P is adjacent to a pixel value patch having a potential maximum and/or potential minimum pixel value. If the selected pixel patch is adjacent to a pixel value patch having a potential minimum pixel value, processing may proceed to step 124 as shown by path 118.

At step 124, extrema detection circuitry 32 may compare the minimum pixel values in each column of the selected pixel value patch to identify a minimum pixel value of the selected pixel value patch. If the selected pixel value patch is adjacent to a pixel value patch having a potential maximum pixel value, processing may proceed to step 126 as shown by path 120.

At step 126, extrema detection circuitry 32 may compare the maximum pixel values in each column of the selected patch to identify a maximum pixel value of the selected patch. If the selected pixel value patch is adjacent to a patch having a potential minimum pixel value and a patch having a potential maximum pixel value, processing may proceed to step 128 as shown by path 122.

At step 128, extrema detection circuitry 32 may compare the maximum pixel values in each column of the selected patch to identify a maximum pixel value of the selected patch and may compare the minimum pixel values in each column of the selected patch to identify a minimum pixel value of the selected patch. If desired, steps 124, 126, and 128 may be performed by second comparator stage 84.

At step 130, extrema detection circuitry 128 may determine whether additional pixel value patches remain in block 70 (e.g., to determine whether pixel value patches remain in block 70 for which minimum and/or maximum pixel values have yet to be identified). If pixel value patches remain in pixel block 70, processing may loop back to step 114 (as shown by path 131) to identify maximum and/or minimum pixel values in the remaining pixel value patches in block 70. If no pixel value patches remain in block 70 (e.g., if a maximum and/or minimum pixel value has been identified for each pixel patch in block 70), processing may proceed to step 132.

At step 132, extrema detection circuitry 32 may compare the identified maximum and minimum pixel values of each pixel value patch in block 70 to determine a maximum and minimum pixel value for block 70. For example, extrema detection circuitry 32 may compare the identified minimum pixel values of the pixel value patches in block 70 to determine a minimum pixel value of block 70 and may compare the identified maximum pixel values of the pixel value patches in block 70 to determine a maximum pixel value of block 70. If desired, step 132 may be performed by third comparator stage 86.

At step 134, extrema detection circuitry 32 may compare the identified minimum and maximum pixel values of pixel block 70 with a selected pixel value in pixel block 70 to determine whether the selected pixel value is a maximum or minimum pixel value of pixel value block 70. For example, circuitry 32 may compare the identified maximum and minimum pixel values of block 70 with central pixel value 68 (FIG. 7). If central pixel value 68 is equal to the minimum pixel value of block 70, pixel value 68 may be identified as the minimum pixel value of block 70. If central pixel value 68 is equal to the maximum pixel value of block 70, pixel value 68 may be identified as the maximum pixel value of block 70.

Figure 12:
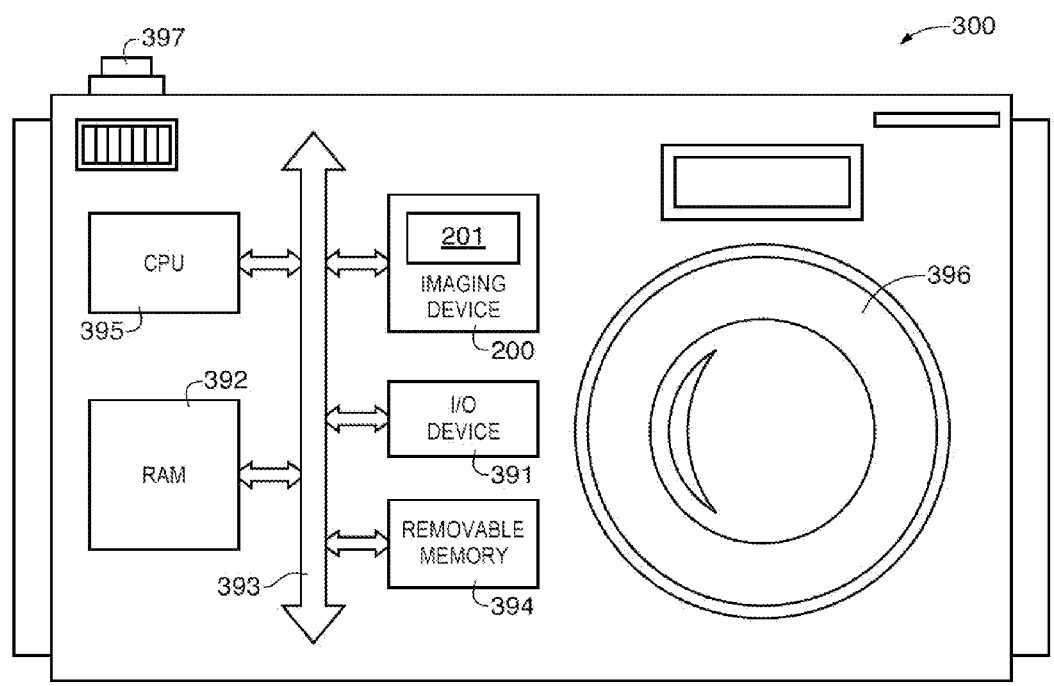
FIG. 12 is a block diagram of an imaging system employing the image sensor, pixel value extrema detection circuitry, and pixel data histogram generation circuitry of FIGS. 1-11 in accordance with an embodiment of the present invention.

FIG. 12 shows in simplified form a typical processor system 300, such as a digital camera, which includes an imaging device 200 (e.g., an imaging device 200 such as imaging system 10 of FIG. 1 employing histogram generation circuitry and extrema detection circuitry as described above in connection with FIGS. 1-11). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300, for example a digital still or video camera system, generally includes a lens 396 for focusing an image on pixel array 200 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating systems and methods for operating an imaging device having an image sensor and pixel data processing circuitry. The image sensor may include an array of image sensor pixels arranged in rows and columns. The pixel data processing circuitry may include pixel data histogram generation circuitry and extrema pixel value identification circuitry. The extrema identification circuitry may include comparator circuitry. The pixel data histogram generation circuitry may include sub-histogram generation circuitry and histogram accumulation circuitry.

The sub-histogram generation circuitry may generate a number of sub-histograms of pixel values that each includes pixel values generated by a respective subset of the image sensor pixels in the array. For example, each sub-histogram may include pixel values generated by image sensor pixels in a respective subset of the rows of the array (e.g., a first sub-histogram may include pixel values obtained by image sensor pixels in the first 20 rows of the array, a second sub-histogram may include pixel values obtained by image sensor pixels in the second 20 rows of the array, etc.).

If desired, the sub-histogram circuitry may include adder circuitry and input gate circuitry. The adder circuitry may include a number of adder circuits that each receive pixel values from image sensor pixels in a corresponding subset of the rows in the array. The sub-histogram circuitry may include bin identification decoder circuitry that provides sub-histogram bin identification signals to the input gate circuitry.

The histogram accumulation circuitry may generate an accumulated histogram of pixel values by combining the sub-histograms generated by the sub-histogram generation circuitry. If desired, the histogram accumulation circuitry may include adder circuitry and input gate circuitry. The adder circuitry may include a number of adder circuits that adds pixel values from a given bin of the sub-histograms of pixel values to a corresponding bin of the accumulated histogram of pixel values. If desired, the histogram generation circuitry may include a number of pipeline registers coupled between the sub-histogram generation circuitry and the histogram accumulation circuitry.

The comparator circuitry in the extrema identification circuitry may include a number of comparator circuit stages. The extrema identification circuitry may receive a set of two-dimensional pixel value patches (e.g., pixel value patches that form a three-dimensional pixel value block) that each have a given number of pixel rows and columns. A first stage of comparator circuitry in the extrema identification circuitry may identify a first set of extremum pixel values (e.g., maximum and/or minimum pixel values) by comparing the pixel values in each of the rows of the pixel value patches. Each extremum pixel value in the first set may be an extremum pixel value of a corresponding column in the set of pixel value patches.

A second stage of comparator circuitry in the extrema identification circuitry may identify a second set of extremum pixel values by comparing each of the extremum pixel values in the first set. Each extremum pixel value in the second set may be an extremum pixel value of a corresponding pixel value patch in the set of pixel value patches. A third stage of comparator circuitry in the extrema identification circuitry may identify an extremum pixel value of the set of pixel value patches by comparing each extremum pixel value in the second of extremum pixel values. The extremum pixel value of the set of pixel value patches may, for example, be a maximum pixel value or a minimum pixel value of the set of pixel value patches. The first and second stages of comparator circuitry may, for example, each have the same number of comparator circuits. The third stage of comparator circuitry may have fewer comparator circuits than the first and/or second stages of comparator circuitry.

If desired, a fourth stage of comparator circuitry in the extrema identification circuitry may compare the identified extremum pixel value of the set of pixel value patches to a given pixel value in the set of pixel value patches (e.g., to a central pixel value in the set of pixel value patches). If the given pixel value is the same as the identified extremum pixel value of the set of pixel value patches, that pixel value may be identified as an extremum pixel value of the set of pixel value patches. If desired, the extremum identification circuitry may determine whether the identified extremum pixel value of the set of pixel value patches is a unique extremum pixel value.

The imaging device having pixel data histogram generation circuitry and pixel extremum identification circuitry may be implemented in a system that also includes a central processing unit, memory, input-output circuitry, and an imaging device that further includes a lens for focusing light onto the array of image pixels in the stacked-chip image sensor, and a data converting circuit.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a group of image sensor pixels;
   sub-histogram generation circuitry configured to generate a plurality of sub-histograms of pixel values, wherein each sub-histogram comprises pixel values generated by a respective subset of the image sensor pixels in the group of image sensor pixels, wherein the sub-histogram generation circuitry comprises:
   input gate circuitry configured to receive the pixel values from the array of image sensor pixels; and
   bin identification decoder circuitry, wherein the bin identification decoder circuitry is configured to provide a sub-histogram bin identification signal to the input gate circuitry; and
   histogram accumulation circuitry configured to generate an accumulated histogram of pixel values by combining the generated plurality of sub-histograms.

2. The electronic device defined in claim 1, wherein the group of image sensor pixels comprises an array of image sensor pixels having rows and columns and wherein each sub-histogram comprises pixel values generated by the image sensor pixels in respective subsets of the rows in the array.

3. The electronic device defined in claim 2, wherein the sub-histogram generation circuitry further comprises adder circuitry configured to receive the pixel values from the input gate circuitry.

4. The electronic device defined in claim 3, wherein the adder circuitry comprises a plurality of adder circuits, wherein each adder circuit is configured to receive the pixel values generated by the image sensor pixels in a corresponding subset of the rows in the array.

5. The electronic device defined in claim 1, wherein the histogram accumulation circuitry further comprises adder circuitry configured to receive the sub-histograms of pixel values from the input gate circuitry.

6. The electronic device defined in claim 5, wherein the adder circuitry comprises a plurality of adder circuits, wherein each sub-histogram of pixel values comprises a plurality of sub-histogram bins, wherein the accumulated histogram of pixel values comprises a plurality of accumulated histogram bins, and wherein each of the adder circuits is configured to add pixel values from a given sub-histogram bin to a corresponding accumulated histogram bin.

7. The electronic device defined in claim 1, further comprising:
a plurality of pipeline registers coupled between the sub-histogram generation circuitry and the histogram accumulation circuitry.

8. A method of identifying an extremum pixel value of a plurality of two-dimensional pixel value patches using pixel data processing circuitry, wherein each pixel value patch includes pixel values arranged in rows and columns, the method comprising:
with a first stage of comparator circuitry in the processing circuitry, identifying a first set of extremum pixel values, wherein each extremum pixel value in the first set comprises an extremum pixel value of a corresponding column in the plurality of pixel value patches;
with a second stage of comparator circuitry in the processing circuitry, identifying a second set of extremum pixel values based on the first set of extremum pixel values, wherein each extremum pixel value in the second set comprises an extremum pixel value of a corresponding pixel value patch in the plurality of pixel value patches;
with a third stage of comparator circuitry in the processing circuitry, identifying an extremum pixel value of the plurality of pixel value patches based on the second set of extremum pixel values; and
with the processing circuitry, determining whether the identified extremum pixel value of the plurality of pixel value patches is a unique extremum pixel value.

9. The method defined in claim 8, wherein identifying the first set of extremum pixel values comprises:
comparing the pixel values in each of the rows of the pixel value patches to identify the first set of extremum pixel values.

10. The method defined in claim 9, wherein identifying the second set of extremum pixel values based on the first set of extremum pixel values comprises:
comparing each extremum pixel value in the first set of extremum pixel values to identify the second set of extremum pixel values.

11. The method defined in claim 10, wherein identifying the extremum pixel value of the plurality of pixel value patches based on the second set of extremum pixel values comprises:
comparing each extremum pixel value in the second set of extremum pixel values to identify the extremum pixel value of the plurality of pixel value patches.

12. The method defined in claim 11, further comprising:
with a fourth stage of comparator circuitry in the processing circuitry, comparing the identified extremum pixel value of the plurality of pixel value patches to a given pixel value in the plurality of pixel value patches.

13. The method defined in claim 8, wherein the first and second stages of comparator circuitry each include a first number of comparator circuits and wherein the third stage of comparator circuitry includes a second number of comparator circuits that is less than the first number of comparator circuits.

14. A system, comprising:
a central processing unit;
memory;
input-output circuitry; and
an imaging device, wherein the imaging device comprises:
an array of image sensor pixels arranged in rows and columns;
a lens that focuses an image on the pixel array;
sub-histogram generation circuitry configured to generate a plurality of sub-histograms of pixel values, wherein each sub-histogram comprises pixel values generated by the image sensor pixels in a respective subset of the rows in the array;
histogram accumulation circuitry configured to generate an accumulated histogram of pixel values by combining the plurality of sub-histograms; and
comparator circuitry configured to receive a plurality of two-dimensional pixel value patches from the array of image sensor pixels, to identify an extremum pixel value of the plurality of pixel value patches using pixel data processing circuitry, and to determine whether the identified extremum pixel value of the plurality of pixel value patches is a unique extremum pixel value.

15. The system defined in claim 14, wherein each pixel value patch in the plurality of pixel value patches has a given number of columns and wherein the comparator circuitry comprises:
a first stage of comparator circuits configured to identify a first set of extremum pixel values, wherein each extremum pixel value in the first set comprises an extremum pixel value of a corresponding column in the plurality of pixel value patches;
a second stage of comparator circuitry configured to identify a second set of extremum pixel values based on the first set of extremum pixel values, wherein each extremum pixel value in the second set comprises an extremum pixel value of a corresponding pixel value patch in the plurality of pixel value patches; and
a third stage of comparator circuitry configured to identify an extremum pixel value of the plurality of pixel value patches based on the second set of extremum pixel values.

* * * * *